United States Patent
Thomas et al.

(10) Patent No.: US 9,527,547 B2
(45) Date of Patent: Dec. 27, 2016

(54) DRIVE ASSEMBLY AND EXERCISE APPARATUS INCLUDING A DRIVE ASSEMBLY

(71) Applicant: RUN4 PTY LTD, Coorparoo, Queensland (AU)

(72) Inventors: William Henry Thomas, Qunaba (AU); Steven Patrick Cranitch, Coorparoo (AU)

(73) Assignee: RUN4 PTY LTD, New South Wales (AU)

( * ) Notice: Subject to any disclaimer, the term of this patent is extended or adjusted under 35 U.S.C. 154(b) by 158 days.

(21) Appl. No.: 14/378,796

(22) PCT Filed: Jan. 21, 2013

(86) PCT No.: PCT/AU2013/000040
§ 371 (c)(1),
(2) Date: Aug. 14, 2014

(87) PCT Pub. No.: WO2013/120126
PCT Pub. Date: Aug. 22, 2013

(65) Prior Publication Data
US 2016/0046351 A1    Feb. 18, 2016

(30) Foreign Application Priority Data

Feb. 17, 2012  (AU) ................................ 2012900603
Jun. 5, 2012   (AU) ................................ 2012902348

(51) Int. Cl.
*B62M 1/26*    (2013.01)
*A63B 21/00*   (2006.01)
(Continued)

(52) U.S. Cl.
CPC .............. *B62M 1/26* (2013.01); *A63B 21/227* (2013.01); *A63B 21/4034* (2015.10);
(Continued)

(58) Field of Classification Search
CPC .. B62M 1/26; A63B 21/4034; A63B 22/0005; A63B 21/227; A63B 22/06664; A63B 22/203; A63B 23/03583; A63B 23/0476; A63B 69/0028; A63B 2022/0053; A63B 2022/0617; A63B 2022/0623; A63B 2022/0629; A63B 2022/0647; A63B 2022/067; A63B 2022/0676; B62K 3/002
(Continued)

(56) References Cited

U.S. PATENT DOCUMENTS 5,611,757 A * 3/1997 Rodgers, Jr. ......... A63B 22/001
                                                  482/51
5,913,751 A   6/1999 Eschenbach
(Continued)

FOREIGN PATENT DOCUMENTS

EP             1151761 B1     11/2005

*Primary Examiner* — Jacob Knutson
(74) *Attorney, Agent, or Firm* — King & Schickli, PLLC

(57) ABSTRACT

There is provided a drive assembly for converting the motion of a person running or jogging into mechanical motion to drive a machine or apparatus, such as self propelled apparatus like a bicycle, or stationary exercise apparatus. The drive assembly comprises a rotatable member, such as a crank arrangement, coupled to a frame of the machine and to stirrups, and where foot pedals are pivotally attached to each of the stirrups. A first pivot is connected between a stirrup and the rotatable member, and a second pivot is connected between the same stirrup and the frame. Preferably, a pivot axis of a foot pedal remains below the first pivot and the second pivot during motion of the foot pedal. Preferably, the pivot axis of the foot pedals trace asymmetric ovate paths during motion of the foot pedals. Motion of the foot pedals drive the rotatable member.

20 Claims, 17 Drawing Sheets

(51) Int. Cl.
*B62K 3/00* (2006.01)
*A63B 21/22* (2006.01)
*A63B 23/035* (2006.01)
*A63B 69/00* (2006.01)
*A63B 22/20* (2006.01)
*A63B 23/04* (2006.01)
*A63B 22/06* (2006.01)
*A63B 22/00* (2006.01)

(52) U.S. Cl.
CPC ...... *A63B 22/0005* (2015.10); *A63B 22/0664* (2013.01); *A63B 22/203* (2013.01); *A63B 22/205* (2013.01); *A63B 23/03583* (2013.01); *A63B 23/0476* (2013.01); *A63B 69/0028* (2013.01); *B62K 3/002* (2013.01); *A63B 2022/0053* (2013.01); *A63B 2022/067* (2013.01); *A63B 2022/0617* (2013.01); *A63B 2022/0623* (2013.01); *A63B 2022/0629* (2013.01); *A63B 2022/0647* (2013.01); *A63B 2022/0676* (2013.01)

(58) Field of Classification Search
USPC .......................................................... 280/256
See application file for complete search history.

(56) References Cited

U.S. PATENT DOCUMENTS

| | | | |
|---|---|---|---|
| 6,398,695 B2* | 6/2002 | Miller | A63B 22/001 482/52 |
| 6,663,127 B2 | 12/2003 | Miller | |
| 6,715,779 B2* | 4/2004 | Eschenbach | B62K 3/002 280/221 |
| 7,276,017 B2* | 10/2007 | Chen | A63B 22/001 482/52 |
| 2001/0011053 A1 | 8/2001 | Miller | |
| 2002/0198083 A1* | 12/2002 | Goh | A63B 22/0012 482/57 |
| 2008/0116655 A1* | 5/2008 | Pate | B62M 1/26 280/221 |
| 2009/0209394 A1 | 8/2009 | Kwon et al. | |

* cited by examiner

DRIVE ASSEMBLY AND EXERCISE APPARATUS INCLUDING A DRIVE ASSEMBLY

TECHNICAL FIELD

The invention generally relates to a drive assembly for converting the motion of a person moving, such as, for example, a person running or jogging, into mechanical motion to drive a machine or an exercise apparatus such as, for example, a bicycle or a stationary exercise apparatus. The invention also relates to a self propelled exercise machine or apparatus, such as a bicycle, including such a drive assembly.

BACKGROUND

Running is a popular activity. However, participation in running declines steadily with age. Reasons for this age related decline in running participation include weight gain, decreasing fitness levels and injury. For instance, when jogging or running a person's joints, such as the ankle and knee joints, become stressed due to the impacting of the feet with a surface on which the person is jogging or running. Over time, these impacts on the person's joints may be substantial and as such, the person may find running uncomfortable or even be unable to run due to the discomfort experienced. Therefore, it is desirable to have an exercise, training and recreational device that simulates the activity of running while alleviating the impact injuries associated with it. In particular, it is desirable for such a device to recruit and train the same muscles used in running so people can continue to train and participate in running activities regardless of their age, weight and fitness level, without the risk of sustaining injuries.

In an attempt to reduce the stresses on joints elliptical trainers have been developed. In general terms, elliptical trainers are stationary type exercise machines which have a frame with elongate pedal platforms located on either side of the frame which provide surfaces on which a person's feet are able to be placed. Opposing ends of the elongate pedal platforms are interconnected via a linkage mechanism with the frame such that the pedal platforms are moveable in a generally elliptical path. In use, the person moves the platforms in the elliptical path such that the person's feet remain generally in contact with the pedal platforms. This assists to alleviate impact injuries associated with the person's foot coming into contact with the surface.

A disadvantage of these elliptical trainers is that the elliptical path traced by the pedals is not sufficiently the same as or suitably approximate to the natural path of the feet traced by a person when jogging and/or running. In particular, the mechanical properties of the elliptical path causes a higher resistance level at the beginning of each weight-bearing stride than during the stride itself. This results in muscle recruitment and activation patterns that are different to running. A person using an elliptical trainer will tend to counteract this higher resistance at the beginning of the elliptical stride by leaning forward. This places more weight on the persons forefoot, engaging the quadriceps and hip flexor muscle groups, and altering the mechanics at the patella, or kneecap, which in turn can strain the knees and cause knee pain after prolonged use.

Furthermore, it is also known to provide a self-propelled exercise machine or apparatus such as bicycle, which includes an elliptical trainer type drive mechanism. More specifically, similarly to the elliptical trainer, the bicycle has a frame with a forward wheel, a rear wheel, and two elongate pedal platforms, which are interconnected with the frame via a linkage mechanism. Each of the elongate platforms is interconnected at opposing ends to the front of the frame and to the rear of the frame, respectively. The bike and the drive mechanism are arranged such that each of the platforms moves in a generally elliptical path so as to propel the bicycle.

As aforesaid, the elliptical motion of such pedal platforms is generally not sufficiently the same as or suitably approximate to the natural path traced by the feet of a person when running. Furthermore, the linkage mechanism to couple the pedal platforms to the frame is generally relatively bulky and is typically located in a position, such as at the rear of the bicycle, which is either awkward and/or potentially unsafe to a person using the bicycle. Moreover, the step-up height from the ground surface to the pedal platforms is uncomfortably high, making starting and stopping the bicycle and riding at low speeds, like for instance climbing a steep hill, awkward and/or potentially less safe to a person using the bicycle.

There is a need for a drive assembly, to drive a machine or apparatus such as a bicycle or a stationary exercise machine, a bicycle, a stationary exercise apparatus, a self propelled exercise machine or apparatus, and/or components thereof, which addresses or at least ameliorates one or more problems inherent in the prior art.

SUMMARY

This summary is provided to introduce a selection of concepts in a simplified form that are further described below in the preferred embodiments. This summary is not intended to identify key features or essential features of the claimed subject matter, nor is it intended to be used to limit the scope of the claimed subject matter.

In a broad form there is provided a drive assembly for utilising motion of a person running or jogging. The drive assembly can be implemented in different machines or apparatus, for example a bicycle, a stationary exercise apparatus and/or a self propelled exercise machine or apparatus (such as a bicycle).

In one aspect, the drive assembly comprises: a rotatable member coupled to a frame of a machine; a stirrup, and a foot pedal pivotally attached to the stirrup; a first pivot connected between the stirrup and the rotatable member; and a second pivot connected between the stirrup and the frame.

Preferably, though not necessarily, in use a pivot axis of the foot pedal remains below the first pivot and the second pivot during motion of the foot pedal. Also preferably, though not necessarily, in use a pivot axis of the foot pedal travels both in front of and behind an axis of rotation of the rotatable member. Also preferably, though not necessarily, in use the pivot axis of the foot pedal also travels both in front of and behind a rearward position of the second pivot. Also preferably, though not necessarily, in use a pivot axis of the foot pedal traces an asymmetric ovate path during motion of the foot pedal. Also preferably, though not necessarily, in use a rearward apex of the foot pedal's path is above a forward apex of the foot pedal's path. Also preferably, though not necessarily, in use the foot pedal traces a reciprocating path which is substantially similar to a path traced by a foot of the person when running or jogging. The pivot axis of the foot pedal can be provided by a pedal spindle.

In another aspect there is provided a bicycle for utilising motion of a person running or jogging, the bicycle comprising a front wheel and a rear wheel attached to a frame, and handle bars attached to the frame. A crank arrangement is attached to the frame and is configured to drive, the rear wheel. Stirrups positioned on either side of the frame, and foot pedals are provided, a foot pedal pivotally attached to each of the stirrups. First pivots are connected between each of the stirrups and the crank arrangement, and second pivots are connected between each of the stirrups and the frame via one or more wheels able to move along a track member.

A stirrup, as used herein, should be read as referring to a mechanical device, structure, assembly or arrangement which has one or more pivoting, rotating, sliding or moving connection points for attachment to another structure or component, such as a frame, arm, rotatable member, crank arrangement, shuttle assembly, etc. The term stirrup is selected as a stirrup, in at least some forms, can be considered to "hang" from one or more connection points, such as one or more pivots, and supports a foot pedal or the like which in turn supports a person's foot. A stirrup, as referred to herein, can include one or more stirrup components and may also be considered as a stirrup arrangement or assembly.

According to an example form, there is provided a drive assembly for converting the motion of a person running or jogging into mechanical motion to drive a machine or apparatus. The motion conversion provided by the drive assembly begins with a pair of pedals, situated on either side of a frame, which provide surfaces on which a person can place their feet. Each pedal rotates around a central spindle, which is attached at one end to one of a pair of stirrups, each of which can be a stirrup arrangement or assembly if there is more than one stirrup component, and may or may not be articulated. In this example each stirrup has three connection points in a triangular formation, with the lower central connection point providing the location where the pedal is attached. The forward connection point of each stirrup is mechanically linked to the frame with a mechanism that constrains its movement to follow a substantially forward upward and backward downward reciprocating path. The rearward connection point of each stirrup is rotatably coupled to a rotatable member(s), in this example to the outer ends of a pair of opposing crank arms that constrain the rearward connection point of the stirrup to follow a circular path as the rotatable member (i.e. crank arrangement) rotates. The crank arms in the crank arrangement are orientated 180° apart, with the inner end of each crank arm linked together on a rotational axis that is coupled to the frame. The drive assembly is configured such that the pedals are each able to trace an asymmetric ovate, or ovoid, path, which is substantially similar to or approximates a path traced by the foot of a person when running or jogging. Accordingly, when a person with their feet in contact with the pedals performs a running like action, it causes the pedals to move along an asymmetric ovate path as the crank arrangement rotates.

In another example form, a pivot couples the forward connection point of each stirrup (which may include more than one stirrup component) to one of a pair of shuttle assemblies. Wheels coupled to each shuttle are constrained by rails on a track member that is integral to the frame, confining the movement of each shuttle assembly to a linear reciprocating path. The front of the track member is tilted upward from the rear end, causing the movement of the stirrup forward connection point coupled via the shuttle assembly to follow a substantially forward upward and backward downward reciprocating path.

In another example form, a grooved rail surface in the track member confines a first wheel mated to the shuttle to follow a linear reciprocating path. A second opposing flat rail surface in the track member confines a second wheel coupled to the shuttle to hold the first wheel in place, slidably mated to the grooved rail surface, as well as to counter sideward twisting movements in the stirrup caused by forces applied to the pedal.

In another example form, opposing grooved rail surfaces in a monocoque track member confine wheels coupled to the shuttle to follow a linear reciprocating path.

In another example form, the frame is substantially similar to that of a conventional "diamond frame" type bicycle, consisting of a front wheel coupled to steering forks, an elongate stem and handle bars, rotationally coupled via a head tube to the horizontally orientated top tube and down tube, braced centrally by a vertically orientated support tube and coupled to the rear wheel via upper and lower chain stays. The track member is located between the top tube at the front end and the vertical support tube at the rear end. A crank arrangement, that may also be generally termed a rotatable member, such as including a sprocket and crank arms, is rotationally coupled to the frame at the upper end of the vertical support tube between the top tube and upper chain stay. The rotational movement in the crank arrangement (i.e. rotatable member) is mechanically communicated to the rear wheel, which propels the bicycle.

In another example form, the forward connection point of each stirrup is coupled to the outer end of one of a pair of swing arms that constrain the forward end of the stirrup to follow a substantially forward upward and backward downward reciprocating path as each swing arm moves independently about a common rotational axis where the swing arm inner end is coupled to the frame.

In another example form, the frame is substantially similar to that of a stationary exercise apparatus, consisting of a transverse frame member connected to and supported by forward and rear cross members horizontally arranged to steady the apparatus on a ground surface. A handle arrangement extends vertically from the forward cross member to a suitable height for a user to grasp. Coupled centrally to the transverse frame member is a fixed housing enclosing a rotatable member such as a flywheel type crank arrangement providing mechanical resistance for drive assembly to function as an exercise apparatus.

In another example form, the stirrups of the previous form are replaced by pedal arms, which are indirectly coupled to the crank arrangement via swing arms, tie rods and/or rocker arms.

In another example form, the rocker arms of the previous form are replaced by pairs of push rods that decouple the location of the crank arrangement in relation to drive assembly.

In another example form, the crank arrangement is located substantially rearward of the common rotational axis where the swing arms are coupled to the frame.

In another example form, the crank arrangement is located substantially forward of the common rotational axis where the swing arms are coupled to the frame.

In another example form, a second drive assembly is mechanically coupled above the first drive assembly and configured to provide a reciprocating handle for a person using the exercise apparatus to grasp and move with their hands along the path usually traced by the hands when running.

BRIEF DESCRIPTION OF THE FIGURES

Example embodiments should become apparent from the following description, which is given by way of example only, of at least one preferred but non-limiting embodiment, described in connection with the accompanying figures, in which.

PREFERRED EMBODIMENTS

The following modes, given by way of example only, are described in order to provide a more precise understanding of the subject matter of a preferred embodiment or embodiments.

Figure 1:
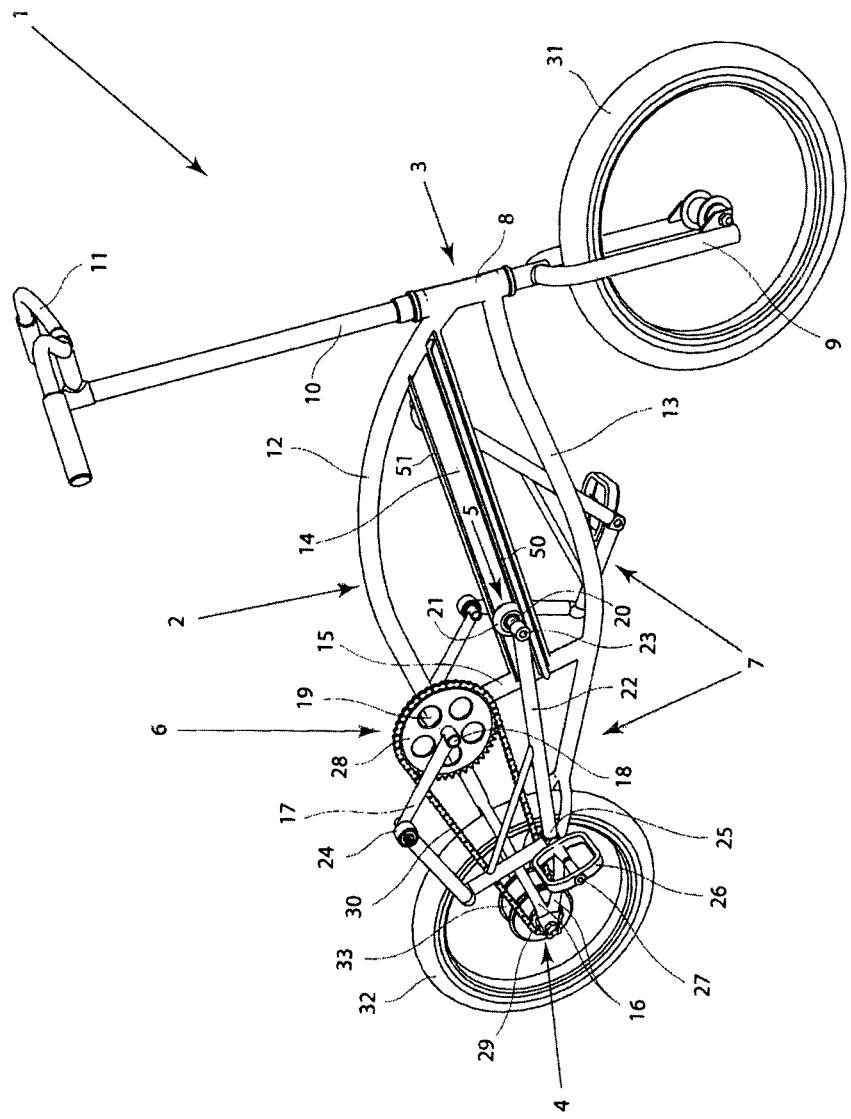
FIG. 1 is a front perspective view of an example bicycle including a drive assembly for converting the motion of a person running into mechanical motion to propel the bicycle.
Figure 2:
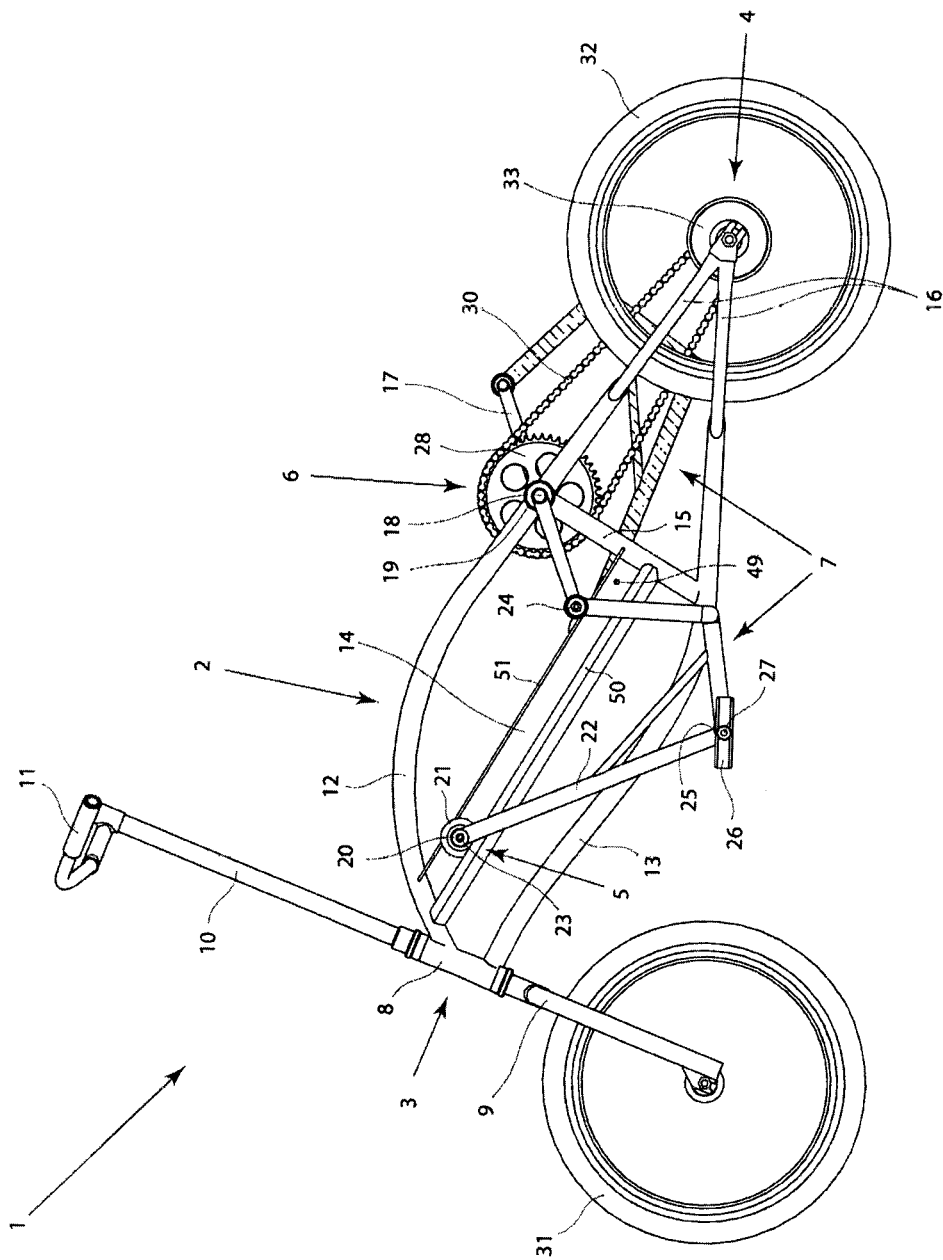
FIG. 2 is a side view illustrating the example bicycle.
Figure 3:
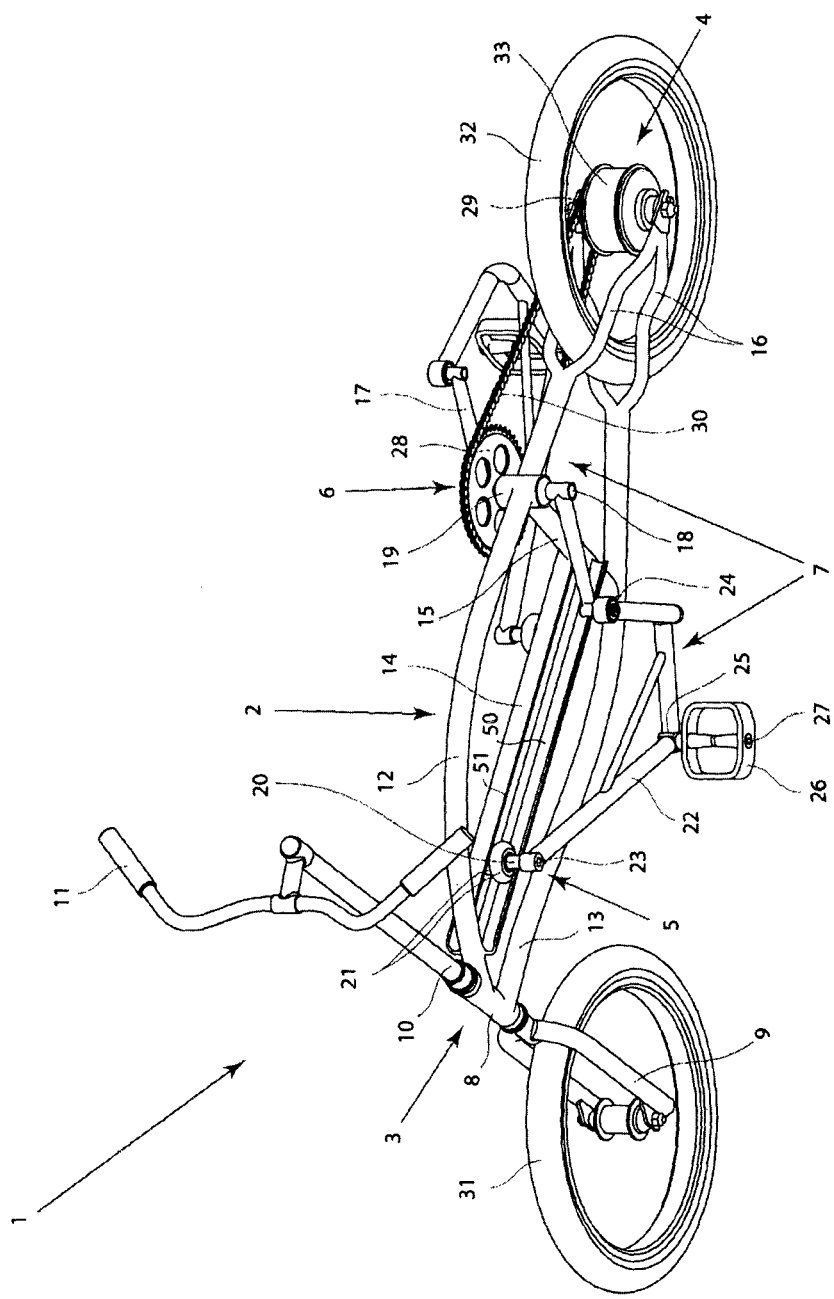
FIG. 3 is a top view illustrating the example bicycle.

In the figures, incorporated to illustrate features of an example embodiment, like reference numerals are used to identify like parts throughout the figures Referring to FIGS. 1, 2 and 3, there is shown an example of a self propelled exercise machine or apparatus in the form of a bicycle (1) which includes a drive assembly (7) for converting the motion of a user, more specifically a person undergoing a running or jogging like motion, into mechanical motion to propel the bicycle (1).

The bicycle (1) includes a frame (2) having a front end (3) and a rear end (4). Steering forks (9) are pivotally coupled to the head tube (8) at the front end (3). The steering folks (9) are coupled with a front wheel (31). Handle bars (11) are supported on top of an elongate stem (10), which is interconnected with the pivoting steering forks (9) such that the user is able to steer the front wheel (31) of the bicycle (1). The frame (2) is a diamond type frame and is splayed toward the rear end (4) to provide upper and lower chain stays (16) which are coupled to and support a rear wheel (32).

In this example, the frame (2) is formed from tubular metal construction, including a head tube (8), top tube (12), down tube (13) vertical supporting tube (15) and upper and lower chain stays (16). For example, aluminium tubing. However, other suitable materials such as other metals, plastics or composite material may also be used. Furthermore, the frame (2) may be configured to fold, for example, by providing a releasably securable pivot point (not shown) between the front end (3) and the rear end (4).

The drive assembly (7) is supported by and coupled to the frame (2) between the front end (3) and the rear end (4). The drive assembly (7) converts the motion of a person running into mechanical motion to propel the bicycle (1).

Figure 4:
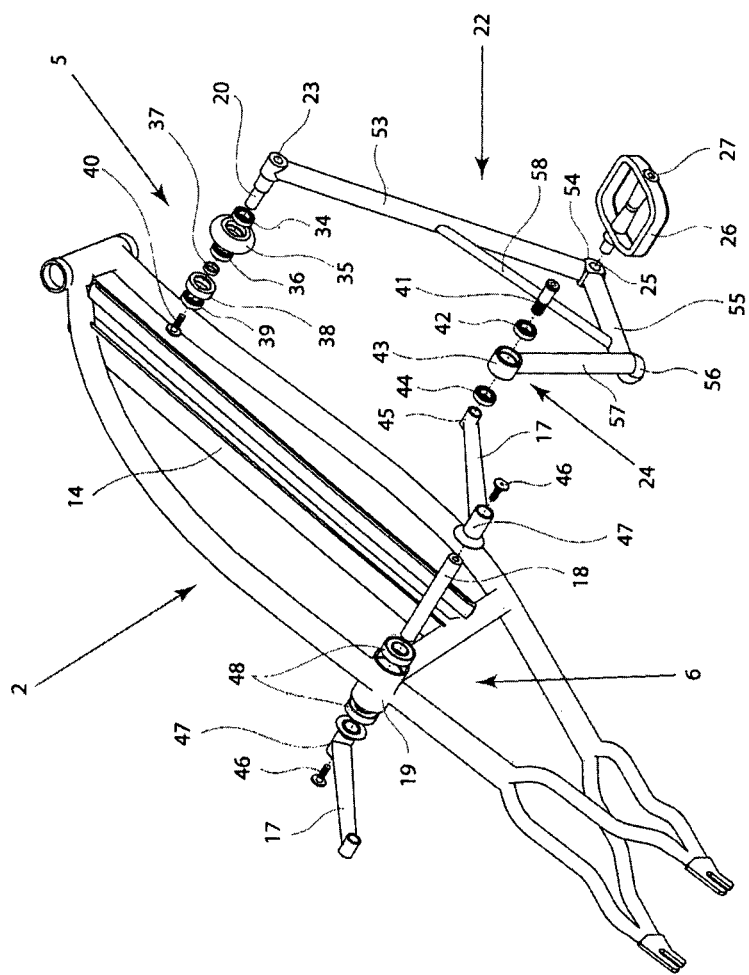
FIG. 4 is an exploded parts view of one side of the drive assembly as it connects to the example bicycle frame.

The motion conversion provided by the drive assembly (7) begins with a pair of pedals (26), situated on either side of the frame (2), on which a person (not shown) operating the bicycle (1) places their feet. Each pedal (26) rotates around a central spindle (27) which is attached at one end (25) to one of a pair of structures, herein referred to as stirrups (22) because stirrups (22) each hang from connection points at a first pivot (24) and a second pivot (23) on either side of the frame (2) to support the user's foot (not shown) via the pedals (26). A stirrup, as referred to herein, can include one or more stirrup components, as illustrated in FIG. 4, and may be considered as a stirrup arrangement or assembly. The stirrups (22) are situated between the pedals (26) and the frame (2), such that the pedals (26) are the outermost protrusion from either side of the frame (2).

Each stirrup (22) has three connection points in a triangular formation: a forward pivot (23), which mechanically links each stirrup (22) to the frame (2) via one of a pair of shuttle assemblies (5); a rearward pivot (24), which couples each stirrup (22) to one of a pair of opposing crank arms (17) which are components of rotatable member (i.e. crank arrangement) (6); and the stirrup pedal attachment point (25), which is situated substantially below and in between the forward (i.e. second) stirrup pivot (23) and the rearward (i.e. first) stirrup pivot (24). As a consequence, when a person (not shown) operates the bicycle (1) with feet in contact with the pedals (26), the person's feet are located substantially below and in between the forward (23) and rearward (24) stirrup pivots.

The forward pivot (23) of each stirrup (22) is mechanically linked to the frame (2) via one of a pair of shuttle assemblies (5). Each shuttle assembly (5) has a set of wheels (21) rotationally supported by a spindle (20), which travel along and between opposing grooved (50) and flat (51) rail surfaces in the track member (14), which is integral to the frame (2), but in another form may be a separate component attached to the frame (2). The wheels (21) travelling along the rail surfaces (50, 51) confine each shuttle assembly (5) to follow a linear reciprocating path collinear with the track member (14).

The front of the track member (14) is affixed to the top tube (12) and the track member (14) tilts upward from the rear, which is affixed to the vertical supporting tube (15) of the frame (2). Consequently, the angle of the track member (14) constrains the movement of the stirrup forward pivot (23), via the shuttle assembly (5) to follow a substantially forward upward and backward downward reciprocating path.

The rearward pivot (24) of each stirrup (22) is coupled to the outer ends of one of a pair of opposing crank arms (17). The crank arms (17), which together are part of a crank arrangement (i.e. rotatable member) (6), are orientated 180° apart, with the inner end of each crank arm (17) linked together by a crank shaft (18). The crank shaft (18) is supported for rotation within a housing (19) of the frame (2) such that the crank shaft (18) is able to be coupled at either end to the crank arrangement (6). The crank shaft (18) supports a driving sprocket (28), also a component of the rotatable member, for likewise rotation therewith. The driving sprocket (28) is interconnected via a chain (30) with a driven sprocket (29), which is coupled with a rear hub (33). The rear hub (33) preferably, though not necessarily, includes an internally geared transmission (not shown) common to bicycles of the present day to rotate the rear wheel (32).

Whilst in this example, the drive assembly (7) includes a chain (30) and sprockets (28, 29), other configurations of the drive assembly (7) may also be utilised such as a belt drive or shaft drive between the crank arrangement (i.e. rotatable member) (6) and rear hub (33) to drive the rear wheel (32). Additionally, the rear hub (33) is able to employ alternative transmission systems, such as a chain geared transmission which uses a cluster of sprockets and chain derailleur, which is also common to bicycles of the present day.

Referring now to FIG. 4, there is shown an exploded view of the individual components that constitute the shuttle assembly (5), the stirrup forward pivot (23), the stirrup rearward pivot (24), and the crank arrangement (6).

A pedal (26) that rotates around a central spindle (27) is attached at one end of the spindle (27) to the stirrup (22) at the stirrup pedal attachment point (25).

The stirrup forward pivot (23) includes a spindle (20) to which a first bearing (34) and second bearing (36) support the rotation of a first wheel with a rounded outer surface (35). A circular spacer (37) separates the second bearing (36) from a third bearing (39), which supports the rotation of a second wheel with a flat outer surface (38). A threaded fastener (40) holds the wheels (35, 38) supported by the bearings (34, 36, 39) and separated by the spacer (37) in place on the stirrup (22) forward pivot (23) spindle (20).

Referring back to FIG. 2, a shuttle fastener access hole (49) is provided in the track member (14) for a hex key wrench (not shown) to tighten and loosen the threaded fastener (40) in FIG. 4 to facilitate the assembly and disassembly of the shuttle assembly (5).

Returning to FIG. 4, the stirrup rearward pivot (24) includes a housing (43), which is rotationally supported by a first bearing (42) and a second bearing (44), which are fastened to the outer end (45) of the crank arm (17) by a threaded spindle with a capped end (41). Other forms of pivot mechanism are also able to be used.

The crank arrangement (6) includes two opposing crank arms (17) orientated 180° apart. The inner ends (47) of the crank arms (17) are coupled to either end of a shaft (18) by threaded fasteners (46). The shaft is supported for rotation by two bearings (48) seated within a housing (19) of the frame (2). The crank arrangement (6) includes an off-the-shelf 180 mm crank set common to bicycles of the present day. Bicycle crank sets with shorter crank arm (17) lengths, for instance 175 mm, 170 mm, 165 mm etc. may be substituted to reduce the overall stride length created by the drive assembly (7) of the bicycle (1) to suit runners with a smaller stature.

Figure 5:
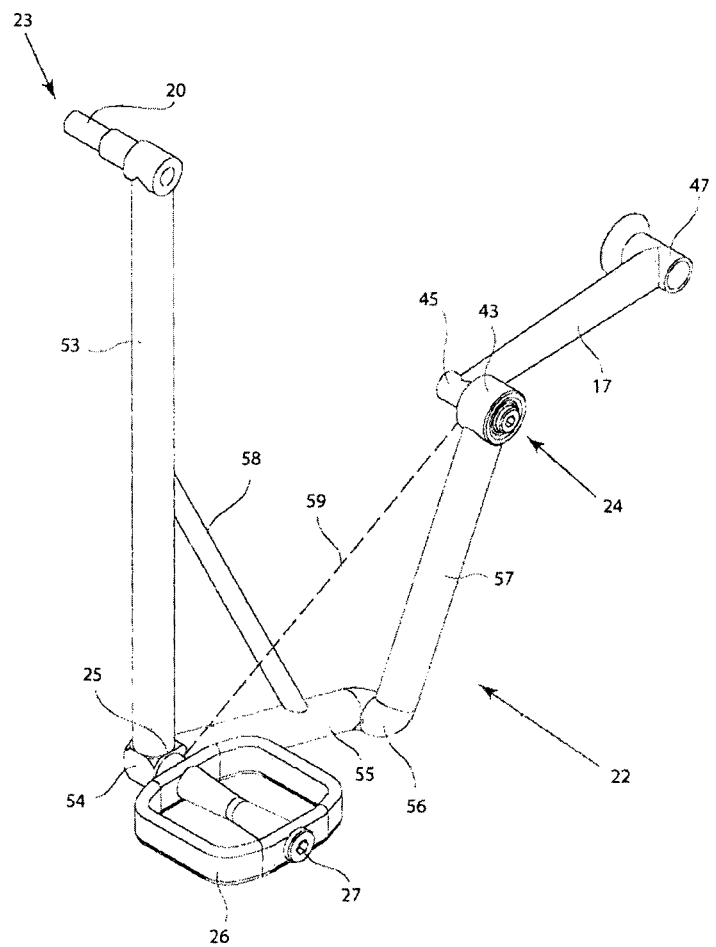
FIG. 5 is a close-up view of an example stirrup showing how a pedal attachment point is aligned with an outer end of a crank arm by use of a pedal offset lug.

Referring to FIG. 5, there is illustrated a close-up view of stirrup (22) showing how the pedal attachment point (25) is aligned along the dashed line (59) with the outer end of crank arm (45) by use of the pedal offset lug (56). Importantly, the stirrup (22) has been designed to offset the position of the pedal (26) inward so that it remains the same distance from the centerline of the frame (2) as it would be if the pedal (26) were attached to the outer end (45) of the crank arm (17). This also allows, optionally, for crank arms (17) to be bent, curved or angled inwards towards the frame (2), that is from the crank arm inner end (47) to the crank arm outer end (45). Accordingly, the stirrup (22) includes a horizontal link tube (55), which is affixed at the rear end by a pedal offset lug (56) to the bottom end of the rear vertical tube (57). The top of the rear vertical tube is affixed to the stirrup rearward pivot (24) housing (43). The rear vertical tube (57) is of sufficient length to prevent a collision between the horizontal link tube (55) and the crank arm (17) as it rotates. The horizontal link tube is also of sufficient length to prevent the heel of a user's foot (not shown) placed upon the pedals (26) from coming in contact with the rear vertical tube (57). The front end of the horizontal link tube (55) is affixed by a pedal attachment lug (54) to the bottom end of the vertical front tube (53). The top end of the vertical front tube (53) is affixed to the stirrup forward pivot (23) spindle (20) of the shuttle assembly (5). A diagonal support tube (58) is affixed between the horizontal link tube (55) and the vertical front tube (53) to resist flexing in the stirrup when forces are applied by the user's foot to the pedal (26). The diagonal support tube (58) is located so as to avoid collision with the crank arm (17) as it rotates.

Figure 6:
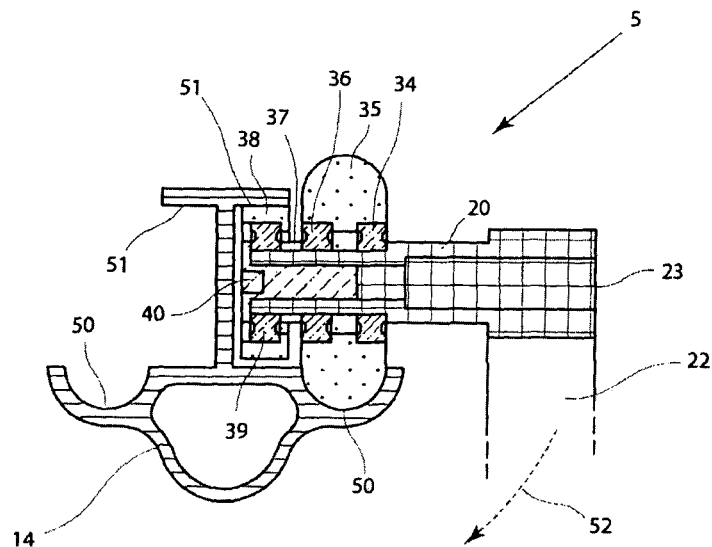
FIG. 6 is a cross sectional view illustrating the track member and shuttle assembly used in the example bicycle.

Referring now to FIG. 6, there is shown a cross-section view of the stirrup forward pivot (23), shuttle assembly (5) and track member (14).

The stirrup forward pivot (23) includes a spindle (20) to which a first bearing (34) and second bearing (36) support the rotation of a first wheel with a rounded outer surface (35), which mates with the grooved rail (50) of the track member (14). A spacer (37) separates the second bearing (36) from a third bearing (39), which supports the rotation of a second wheel with a flat outer surface (38). The second wheel (38) mates to an opposing flat rail (51) of the track member (14). A threaded fastener (40) holds the wheels (35, 38) supported by the bearings (34, 36, 39) and separated by the spacer (37) in place on the stirrup forward pivot (23) spindle (20).

The flat rail (51) opposes the grooved rail (50) of the track member (14) causing the second wheel (38) of the shuttle assembly (5) to hold the first wheel (35) in place, mated to the grooved rail (50) as well as to counter sideways twisting (52) of the stirrup (22) by forces applied to the pedal (not shown).

Figure 7:
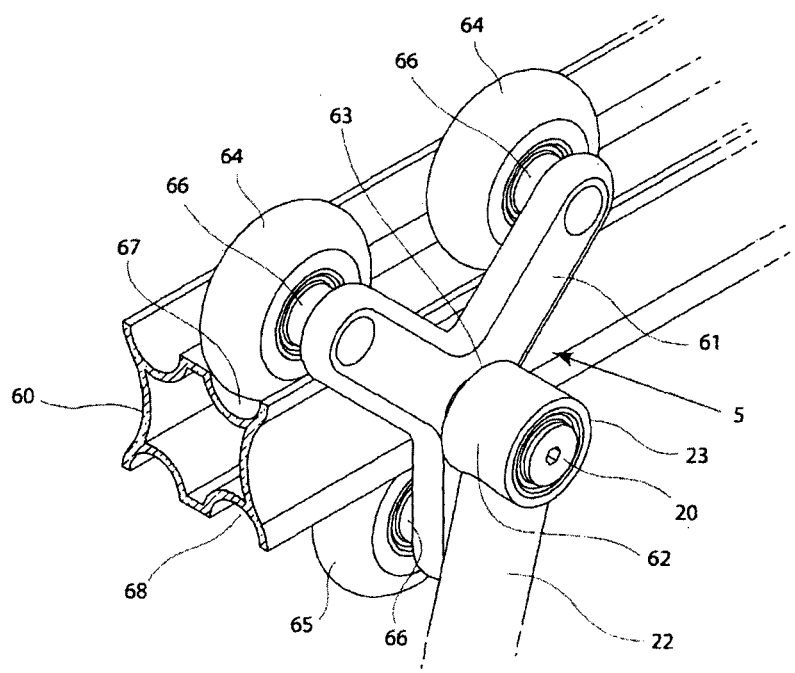
FIG. 7 is a perspective view illustrating an example monocoque track member with opposing grooved rails and shuttle assembly.

Referring now to FIG. 7, there is shown an alternative example shuttle assembly (5) coupled to a monocoque track member (60) with opposing grooved rails. In this configuration the rotational axis of the stirrup forward pivot (23) is independent of the rotational axes of the shuttle assembly (5) wheels (64, 65).

The stirrup forward pivot (23) includes a housing (62), which is supported for rotation by a spindle (20), which is attached at one end (63) to a Y shaped shuttle member (61). Three wheels (64, 65) with rounded outer surfaces are rotationally supported by axles (66) which are attached at one end to the outer ends of Y shaped shuttle member (61). The upper pair of wheels (64) is mated to a grooved rail surface (67) that runs along the top of the monocoque track member (60). The lower wheel (65) is mated to an opposing grooved rail surface (68), which runs along the bottom of the track monocoque member (60).

The lower grooved rail (68) opposes the upper grooved rail (67) of the monocoque track member (60) causing the lower wheel (65) of the shuttle assembly (5) to hold the upper wheels (64) in place, mated to the upper grooved rail (67) as well as to counter sideways twisting of the stirrup (22) by forces applied to the pedal (not shown).

Figure 8:
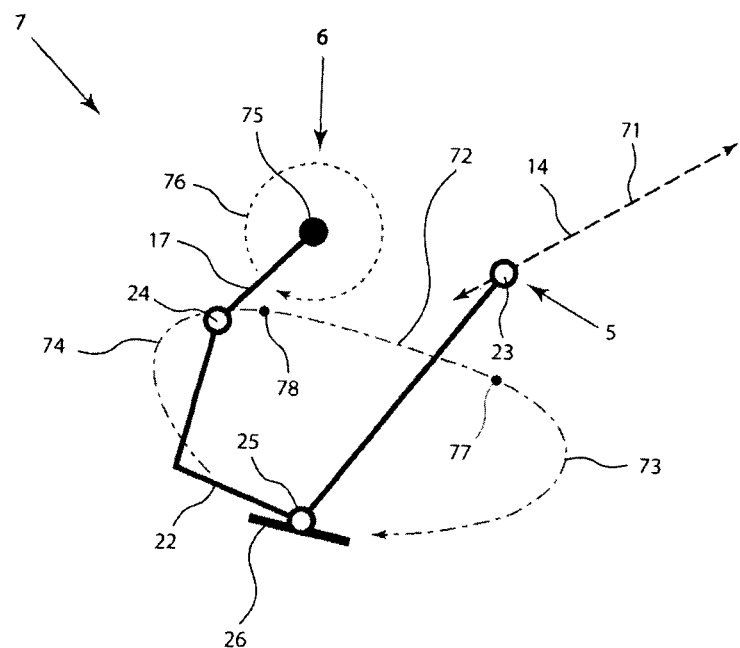
FIG. 8 is a side schematic view illustrating how the drive assembly of the example bicycle creates the motion path of the pedals.

Referring now to FIG. 8, there is shown a side schematic view demonstrating how the basic elements of the drive assembly (7), as described in relation to FIGS. 1, 2 and 3, interact to create a motion path (72) of the pedals (26).

In use, a person's feet (not shown) move the pedals (26) along an asymmetric ovate, or ovoid, path (72) that is created by the drive assembly (7), in particular by the interaction of the stirrup (22) with the shuttle assembly (5) and crank arrangement (6). The stirrup forward pivot (23) is constrained by the movement of shuttle assembly (5) along the track member (14) to follow a substantially forward upward and backward downward reciprocating path (71). The stirrup rearward pivot is constrained by the rotation the crank arrangement (6) to follow a circular path (76) as the crank arm (17) rotates around its axis (75). It is the interaction between the reciprocating linear path (71) of the stirrup forward pivot (23) and circular path (76) of the stirrup rearward pivot (24) that combine at the pedal attachment point (25) to create the asymmetric ovate path of the pedal (26):

When the pedal (26) is positioned at the rearward apex (74) of the path (72) it is situated well above its position at the forward apex (73) of the path (72). This characteristic matches the natural path traced by the foot of a person when running or jogging.

There is an upper dead point (78) along the path (72) when the pedal (26) has a vertical angular velocity of zero, which is the point where the vertical angular velocity of the pedal (26) changes from positive to negative. There is also an upper centre point (77) along the path (72) when the knee of a person moving the pedals (26) with their feet (not shown) has an angular velocity of zero, which is the point where the angular velocity of the knee changes from positive to negative, which is also the point when flexor muscle activity, which bends the knee, switches over to extensor muscle activity, which straightens the knee.

Figure 9:
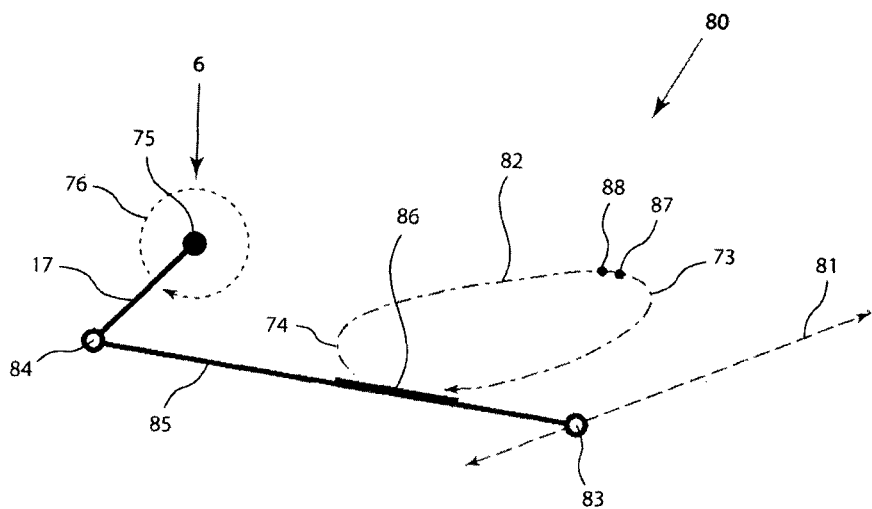
FIG. 9 (prior art) is a side schematic view illustrating by way of comparison how the drive assembly of an elliptical type exercise machine creates a different motion path of the pedal platform.

Referring now to FIG. 9 (prior art), there is shown by way of comparison a side schematic view illustrating how the drive assembly (80) of an elliptical exercise machine creates an elliptical motion path (82) of a pedal (86). The pedal (86) upon which a person using the elliptical exercise machine places their foot (not shown), is situated on an elongate pedal platform (85). The front end (83) of the elongate pedal platform (85) is slidably mounted to a guide track (81), which constrains the movement of front end (83) of the elongate pedal platform (85) to follow a substantially forward upward and backward downward reciprocating path (71). The rear end (84) of the elongate pedal platform (85) is rotatably coupled to a crank arrangement (6), which constrains the rear end (84) of the elongate pedal platform (85) to follow a circular path (76) as the crank arm (17) rotates around its axis (75). It is the interaction between the reciprocating path (81) of the front end (83) of the elongate pedal platform (85) and circular path (76) of the rear end (84) of the elongate pedal platform (85) that combine to create the elliptical path (82) of the pedal (86).

When the foot platform (86) is positioned at the rearward apex (74) of the elliptical path (82) it is situated well below its position at the forward apex (73) of the elliptical path (82). This characteristic of the elliptical path (82) does not match the natural path traced by the foot of a person when running or jogging.

There is an upper dead point (88) along the elliptical path (82) when the pedal (86) has a vertical angular velocity of zero, which it the point at where the vertical angular velocity of the pedal (86) changes from positive to negative. There is also an upper centre point (87) along the elliptical path (82) when the knee of a person moving the pedal (86) with their feet (not shown) has an angular velocity of zero, which is the point at where the angular velocity of the knee changes from positive to negative.

Referring now to both FIG. 8 and FIG. 9, the characteristics of the asymmetric ovate path (72) are compared to those of the elliptical path (82). On superficial examination, each drive assembly (7, 80) appears to have some basic elements in common, in particular, the use of a linking structure (22, 85) between a linear reciprocating mechanism at the front (14, 81) and a rotating crank mechanism (6) at the rear. However, closer examination of FIG. 8 in comparison to FIG. 9 reveals that the deliberate placement of a pivoting foot pedal (26) well below the forward (i.e. second) (23) and rearward (i.e. first) pivots (24) in combination with the track member (14) and crank arrangement (6) being closer together creates significant advantageous differences in the characteristics of the pedal's (26) path (72).

In relation to the forward apex (73), the rearward apex (74) of the asymmetric ovate path (72) is substantially higher than the rearward apex (74) of the elliptical path (82). Consequently, it can be stated that the asymmetric ovate path more closely matches the natural path traced by the foot of a person when running or jogging than does the elliptical path (82).

In use, a person riding a bicycle (1) incorporating either drive assembly (7, 80) must lift their foot from a ground surface to the pedal (26, 86) in order to commence riding. Accordingly, a low pedal step-up height improves the operability of such a bicycle (1). Advantageously, the asymmetric ovate path (72) positions the pedal (26) at all times below the track member (14) and crank arrangement (7) whereas the elliptical path (82) positions the pedal (86) well above the guide track (81). Consequently, the pedal step-up height of the asymmetric ovate drive assembly (7) is similar to that of a conventional present day bicycle, whereas the pedal step-up height of the elliptical drive assembly (80) is substantially higher, making it more difficult to use. Furthermore, and referring to FIG. 8 and FIG. 9, using a rotatable foot pedal (26) provides advantages over using a non-rotatable foot pad or platform (86) as is used in a conventional elliptical trainer (80). When using the foot pad or platform (86) on a conventional elliptical trainer (80) users lift their heel off the pad or platform, which deviates from the normal motion of a person running or jogging. In contrast, by using rotatable foot pedals a user maintains contact between the user's feet and the rotatable foot pedals, so that the user does not need to push up from a platform to raise their heel but instead the rotatable foot pedal allows the user to more closely mimic the normal motion of a person running or jogging.

As may be appreciated from the Figures, the upper dead point (78) of the pedal (26) on the asymmetric ovate path (72) is situated closer to the rearward apex (74) whereas the upper dead point (88) of the pedal (86) on the elliptical path (82) is situated closer to the forward apex (73). This property of the elliptical drive assembly (80) leads to substantially higher resistance at the beginning of each stride (87) of the elliptical path (82) than during the stride itself. The high resistance is caused by the upper centre point (87) of the knee being relatively close to the higher resistance zone created by upper dead point (88) of the pedal (86). This high resistance zone in the elliptical path (82) can strain the knees. By contrast, the upper centre point (77) of the knee on the asymmetric ovate path (72) is well separated from the upper dead point (78) of the pedal, resolving this high resistance problem.

Figures 10, 10A, 10B, 10C, 10D:
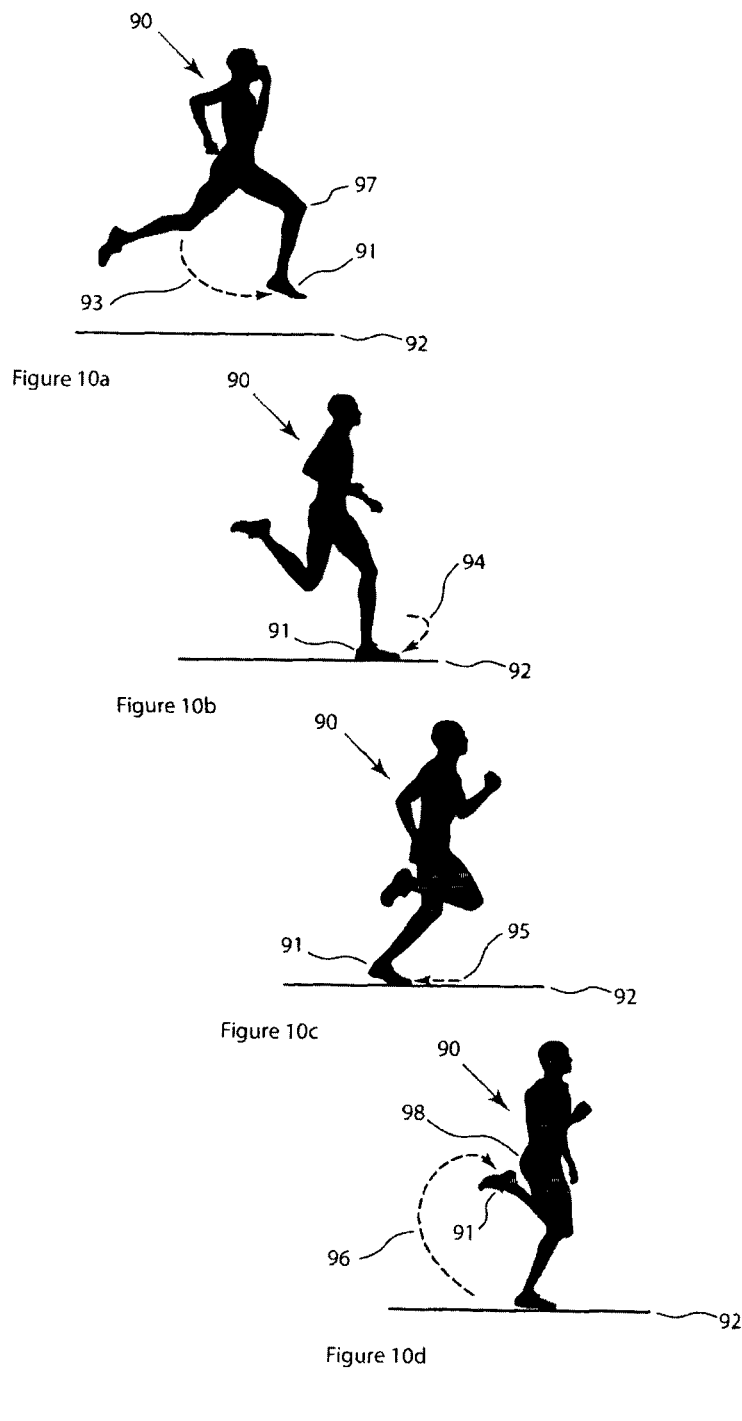
FIGS. 10*a* to 10*d* (prior art) are side views illustrating the path of a person's foot while running during the leap, impact, drive and recovery phases.

Referring now to FIGS. 10a to 10d (prior art), there is shown the individual path segments (93, 94, 95, 96) traced by the foot (91) of a person running (90). Beginning with FIG. 10a, there is shown the leap phase (93) when both of the runner's (90) feet momentarily leave the ground surface (92) as the front foot (91) swings forward from the runner's knee (97). Referring to FIG. 10b, there is shown the impact phase (94) where the runner's (90) foot (91) curves downward to make contact with the ground surface (92). This is followed by the drive phase (95) shown in FIG. 10c, where the runner's (90) foot (91) drives backward to propel the runner (90) forward over the ground surface (92). Finally, during the recovery phase (96) shown in FIG. 10d, the runner's (90) foot (91) leaves the ground surface and tucks up against the runners buttocks (98).

Figure 11:
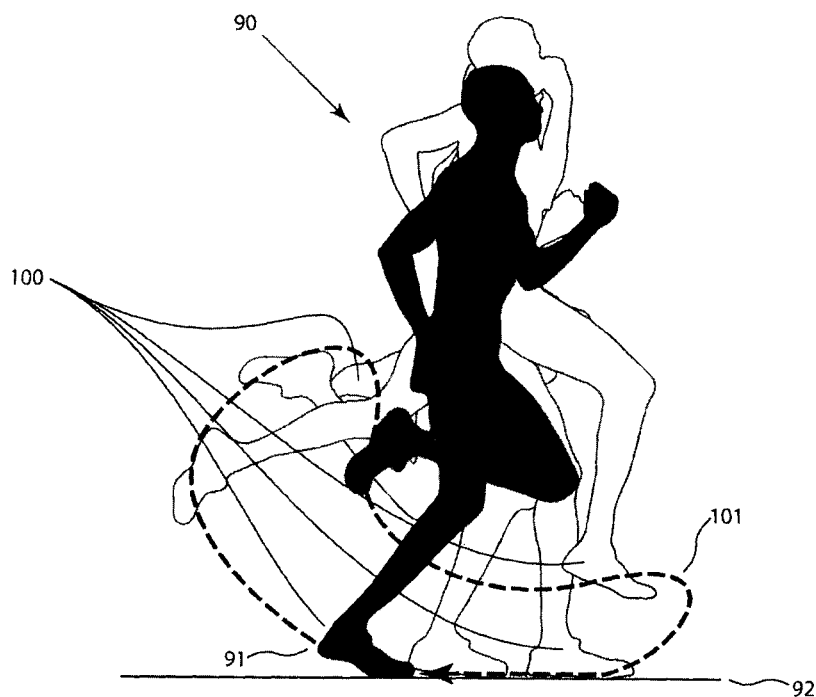
FIG. 11 (prior art) is a side view illustrating the path of a person's foot while running.

Referring to FIG. 11 (prior art), there is shown outlines of the leap, impact, drive and recovery foot positions (100) and the combined path (101) traced by the foot (91) of the person running (90) relative to a ground surface (92).

Figure 12:
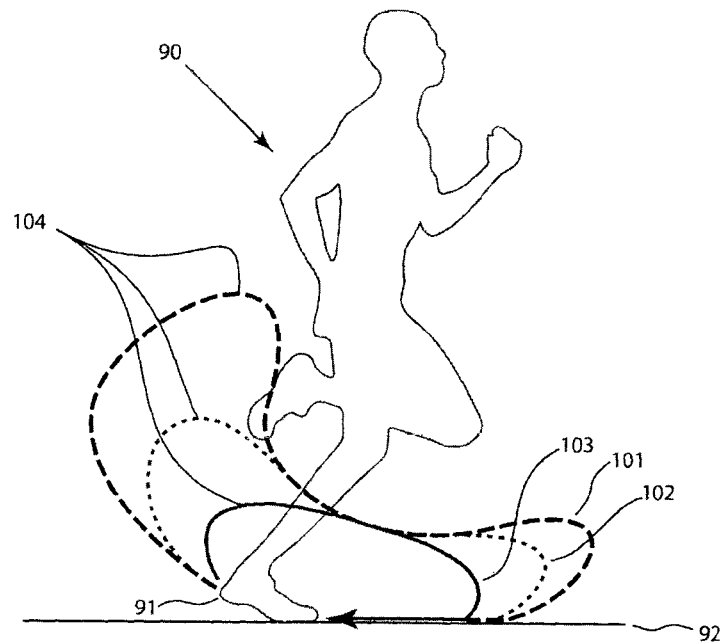
FIG. 12 (prior art) is a side view comparing the path of a person's foot while sprinting, running and jogging.

Referring to FIG. 12 (prior art), there is shown various paths (101, 102, 103) traced by the foot (91) of a person running (90) relative to a ground surface (92). The paths (101, 102, 103) vary in shape, stride length and recovery height (104) depending on the running style of the runner and/or whether the runner is mining quickly or slowly. In particular, the path that the foot (91) of a runner (90) traced when sprinting (101) has a substantially longer stride length and recovery foot height (104) when compared to the path traced by the foot (91) when a runner is running at a more moderate pace (102) or when the runner is jogging (103).

Referring to FIGS. 13a to 13d, there is shown the path segments (110, 113, 116, 119) traced by the pedals (26) in use. Although only one side of the drive assembly (7) is shown in FIGS. 13a to 13d, it is noted that the movement of each pedal (26) is 180 degrees out of phase with the other. Accordingly, when one pedal (26) is in the position shown in FIG. 13a, the other pedal (26) is in the position shown in FIG. 13c, likewise when one pedal (26) is in the position shown in FIG. 13b, the other pedal (26) is in the position shown in FIG. 13d.

Figure 13:
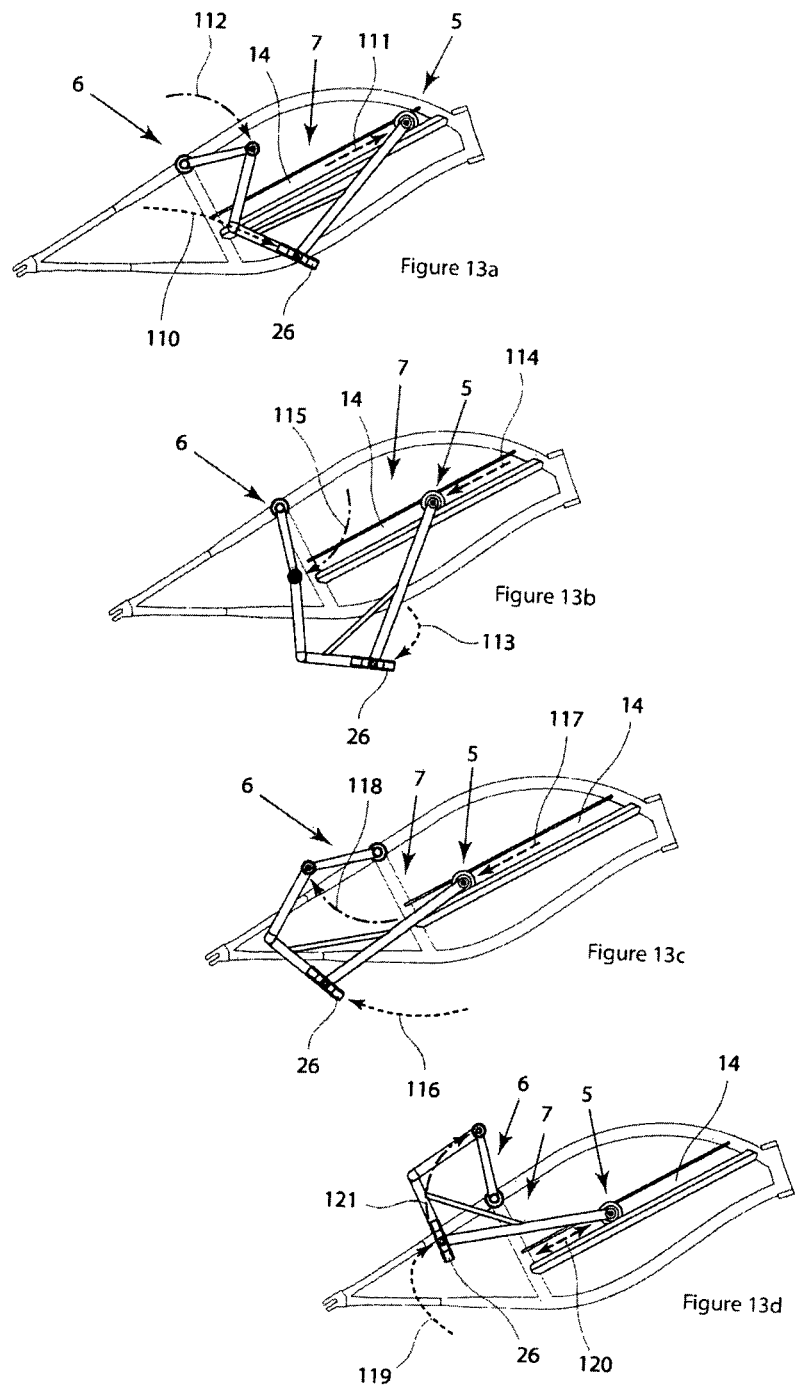
FIGS. 13*a* to 13*d* are side views illustrating the position of the pedals, drive assembly and crank arrangement during a cycle of rotation in the example bicycle.

Beginning with FIG. 13a, there is shown the leap phase (110) where the pedal (26) moves forward as the crank arrangement (6) rotates 90 degrees clockwise (112), and the shuttle assembly (5) moves forward (111) along the track member (14). Referring to FIG. 13b, there is shown the impact phase (113) where the pedal (26) curves downward as the crank arrangement (6) rotates another 90 degrees clockwise (115), and the shuttle assembly (5) moves backward (114) along the track member (14). While the impact phase (113) of the pedal (26) follows a similar curve to that of the runner's (90) foot (91) in FIG. 10b, there is no physical impact as such. Instead, the downward force of the impact phase (113) is captured and converted by the drive assembly (7) into rotational torque in the crank arrangement (6). This is followed, by the drive phase (116) shown in FIG. 13c, where the pedal (26) continues to drive backward as the crank arrangement (6) rotates another 90 degrees clockwise (118), and the shuttle assembly (5) continues to move backward (117) along the track member (14). Finally, during the recovery phase shown in FIG. 13d, the pedal curves upward (119) as the crank arrangement (6) rotates another 90 degrees clockwise (121), and the shuttle assembly (5) moves backward and then forward (120) along the track member (14).

As may be appreciated from FIGS. 13a to 13d, the path traced by the pedal (26) while generally ovate or ovoid in shape is asymmetrical and, as such, none of the path segments (110, 113, 116, 119) traced by the pedals (26) are the same.

Figure 14:
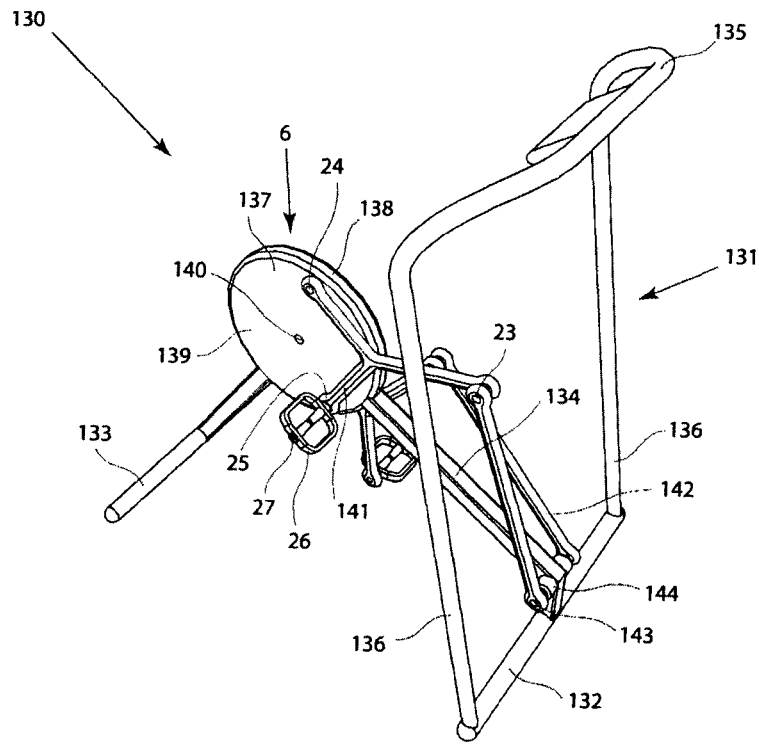
FIG. 14 is a front perspective view illustrating an example stationary exercise machine including a further example drive assembly.

Referring to FIG. 14 there is illustrated a stationary exercise apparatus (130) that has an exercise apparatus frame (131) including a forward frame cross-member (132), a rearward cross-member (133) and a transverse frame member (134). Also provided is a handle arrangement (135) allowing a person using the apparatus to support themselves with their hands. Handle arrangement legs (136) are provided to locate handle arrangement (135) at a suitable height from forward frame cross-member (132). Crank arrangement (6) (i.e. rotatable member) includes a rotatable unit (137) located within, or partially or substantially within, a fixed housing (138). A flywheel (139) can be provided within the fixed housing (138) to provide a form of resistance as a person operates the apparatus (130). Flywheel (139) rotates about centre of rotation of axis (140).

In this example the stirrup is provided as a Y-shaped stirrup (141). A first arm of stirrup (141) is connected to stirrup rearward pivot (24) and a second arm of stirrup (141) is connected to a stirrup forward pivot (23). A third arm of stirrup (141) is connected to pedal (26) via pedal spindle (27), which also provides a stirrup pedal attachment point (25). Stirrup (141) is connected to swing arm (142) via stirrup forward pivots (23). Two stirrups (141) are provided on each side of crank arrangement (6). Each of the stirrups (141) are connected to separate swing arms (142) by stirrup forward pivots (23). At the other end of swing arms (142) swing arm/frame pivots (143) connect the swing arms (142) to the frame (131). There is also provided a housing (144) for the swing arm/frame pivots (143).

Figure 15:
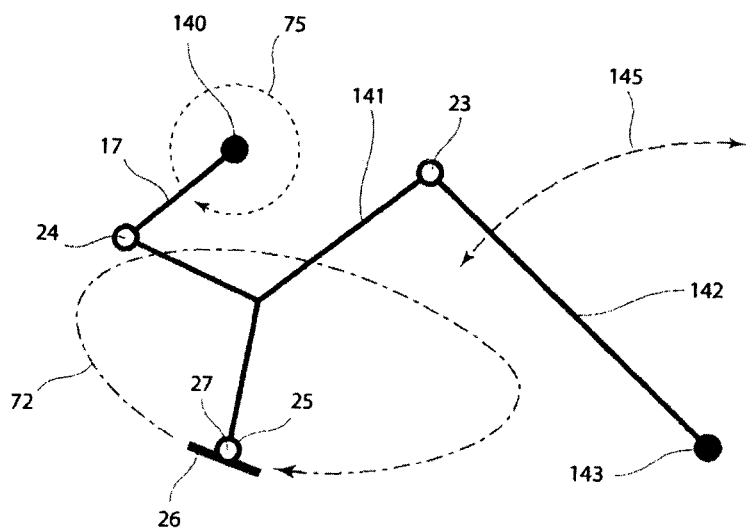
FIG. 15 is a schematic side view illustrating the further example drive assembly of FIG. 14.

Referring to FIG. 15 there is illustrated a schematic side view of the drive assembly of FIG. 14. Flywheel centre of rotation (140) is shown as a fixed rotating point. Swing arm/frame pivot (143) is also shown as a fixed rotating point. Stirrup rearward pivot (24) and stirrup forward pivot (23), as well as pedal spindle (27), are shown as pivots or rotating points that also move spatially and are not fixed at a specific position. An axis of the pedal (26), such as a longitudinal axis of pedal spindle (27), provided at stirrup/pedal attachment point (25), follows an asymmetric ovate path (72) when in use. Also illustrated is the direction of rotation (75) of crank arms (17), which are preferably located within fixed housing (138). Also shown is the swing arm reciprocating motion (145) that is followed by swing arm (142) when in use.

Thus, referring to FIGS. 1 and 14 by way of example, there has been described an example drive assembly for utilising motion of a person running or jogging. The example drive assembly comprising a rotatable member (6) coupled to a frame (2, 131) of a machine (1, 130), a stirrup (22, 141), and a foot pedal (26) pivotally attached to the stirrup (22, 141). A first pivot (24) is connected between the stirrup (22, 141) and the rotatable member (6), and a second pivot (23) is connected between the stirrup (22, 141) and the frame (2, 131).

As is seen most easily by reference to FIGS. 8 and 15, in use a pivot axis of the foot pedal (26) remains below the first pivot (24) and the second pivot (23) during motion of the foot pedal (26). In use a pivot axis of the foot pedal (26) traces an asymmetric ovate path (72) during motion of the foot pedal (26). In use a rearward apex (74) of the foot pedal's path (72) is above a forward apex (73) of the foot pedal's path (72). In use the foot pedal (26) traces a reciprocating path (72) which is substantially similar to a path traced by a foot of the person when running or jogging. The pivot axis of the foot pedal (26) is provided by or aligned along a pedal spindle (27). Furthermore, in use a pivot axis of the foot pedal (26) travels both in front of (i.e. forward of) and behind (i.e. rearward of) an axis of rotation (75) of the rotatable member (6), and also in this example in front of and behind the driving sprocket (28). Still furthermore, in this example, in use the pivot axis of the foot pedal (26) also travels both in front of (i.e. forward of) and behind (i.e. rearward of) a rearward position of the second pivot (23). This is seen by the pedal path 72 extending both forward of and rearward of the most rearward point of second pivot (23).

Motion of the foot pedal (26) drives the rotatable member (6). In one example the rotatable member (6) is a crank arrangement including crank arms (17) and a sprocket (28). In another example the rotatable member (6) is a rotatable unit (137) including a flywheel. A further stirrup (22) is provided on the opposite side of the frame (2, 131), such as either side of top tube (12) or transverse frame member (134), and a further foot pedal (26) is pivotally attached to the further stirrup (22). The second pivot (23) can be connected to the frame (2, 131) via a shuttle assembly (5).

The second pivot (23) is connected to the bicycle frame (2) via a wheel (21) able to move along a track member (50, 51, 60). The track member (50, 51, 60) can be a monocoque track member (60) with one or more grooved rails (50, 67, 68). A frontward end (nearer front end (3)) of the track member (50, 51, 60) is angled upward relative to a rearward end (nearer vertical supporting tube (15)) of the track member (50, 51, 60). At least one grooved rail (50, 67, 68) in the track member (50, 51, 60) confines the wheel (21) to follow a linear reciprocating path. In use a pivot axis of the foot pedal (26) remains below the track member (50, 51, 60) during motion of the foot pedal (26). The second pivot (23) is preferably able to move relative to the frame (2, 131).

In one example the machine is a diamond frame type bicycle (1). The track member (50, 51, 60) can be located between a top tube (12) of the bicycle (1) at a front end (3) and a vertical support tube (15) of the bicycle (1) at a rear end.

In another example the machine is a stationary exercise apparatus (130). In this example the second pivot (23) can be coupled to the frame (131) via a swing arm (142). The stirrup (22) can be a Y shaped stirrup having three arms (141). The first pivot (24) is attached to a first arm, the second pivot (23) is attached to a second arm, and the foot pedal (26) is pivotally attached to a third arm. The rotatable member (6) can be located rearward of the second pivot point (23). Alternatively, the rotatable member (6) can be located forward of the second pivot point (23). An additional hand driven assembly can be mechanically coupled to the rotatable member (6) and provides handles (170) for the person.

In another example there is provided a bicycle (1) for utilising motion of a person running or jogging. The bicycle comprises a front wheel (31) and a rear wheel (32) attached to a frame (2), with handle bars (11) attached to the frame (2). A crank arrangement (6) is attached to the frame (2) and configured to drive the rear wheel (32), and stirrups (22) are positioned on either side of the frame (2). Foot pedals (26) are provided, with a separate foot pedal (26) pivotally attached to each of the stirrups (22). First pivots (24) are connected between each of the stirrups (22) and the crank arrangement (6), and second pivots (23) are connected between each of the stirrups (22) and the frame (2) via one or more wheels (21, 64, 65) able to move along a track member (50, 51, 60).

Figure 16:
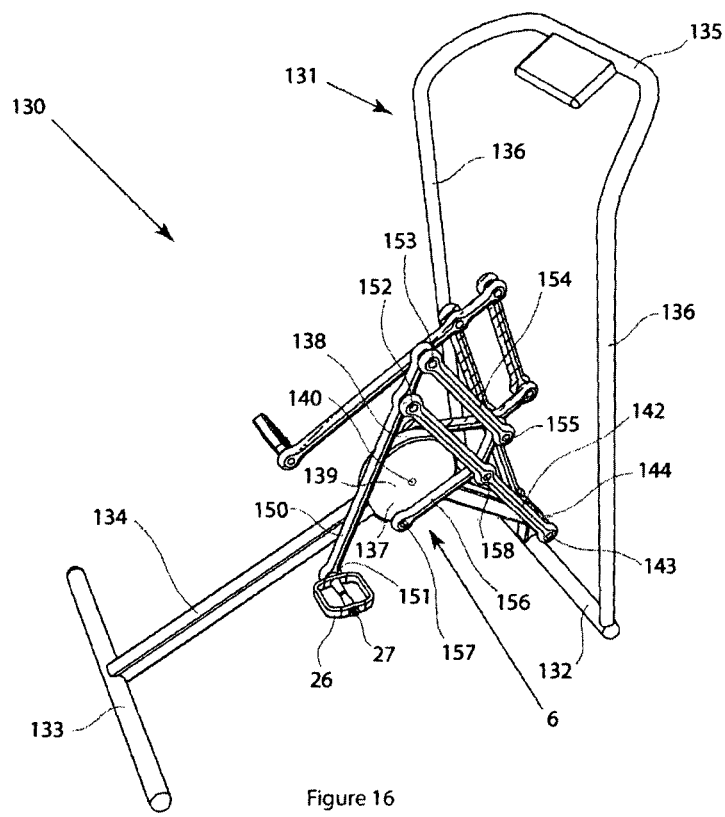
FIG. 16 a rear perspective view illustrating an example stationary exercise machine including a further example drive assembly.

Referring to FIG. 16 there is illustrated a further example stationary exercise machine (130) which includes a further example drive assembly. In this further example pedal arms (150) are attached to pedals (26) at pedal attachment points (151). Pedal arms (150) are connected to swing arms (142) at pedal arm/swing arm pivots (152). Pedal arms (150) are also attached to tie rods (154) by pedal arm/tie rod pivots (153). Rocker arms (156) are attached to tie rods (154) via tie rod/rocker arm pivots (155). Rocker arms (156) are attached to a flywheel (139), or alternatively some other form of resistance mechanism, via rocker arm/flywheel crank pivots (157). Rocker arms (156) are also attached to swing arms (142) via rocker arm/swing arm pivots (158).

Figure 17:
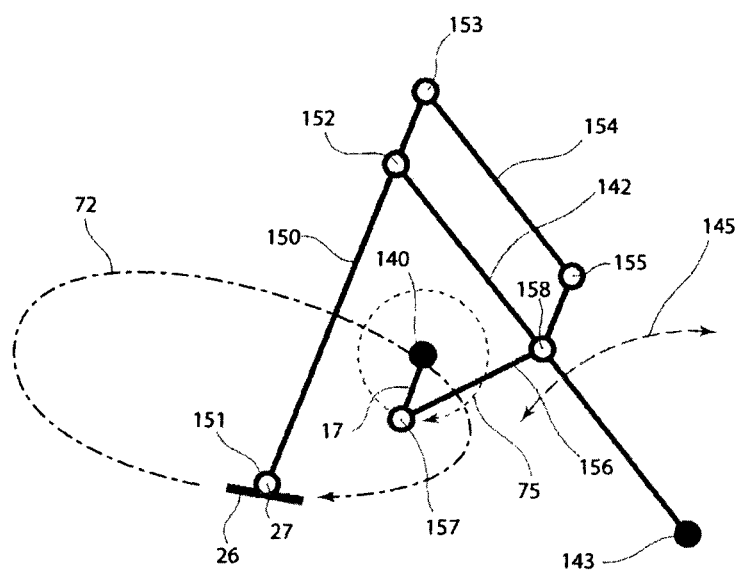
FIG. 17 is a schematic side view illustrating the further example drive assembly of FIG. 16.

Referring to FIG. 17 there is illustrated a schematic side view of the apparatus (130) shown in FIG. 16. As previously, an axis of pedal (26), such as aligned along the axis of pedal spindle (27), traces an asymmetric ovate path (72) when in use. Crank arm (17) axis of rotation (75) is also illustrated, as is swing arm reciprocating motion (145) that is followed by swing arms (142).

Figure 18:
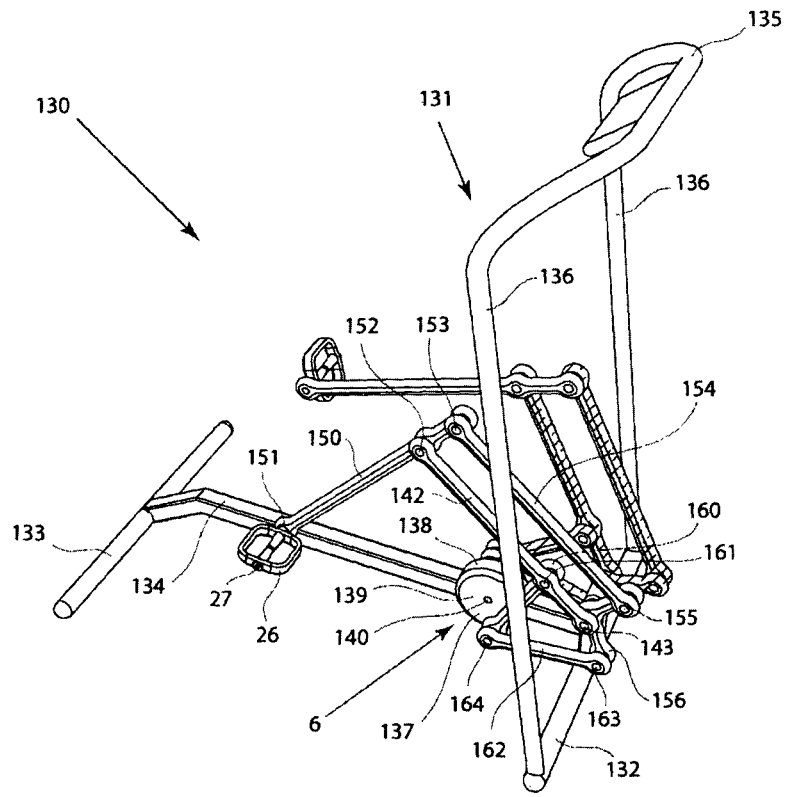
FIG. 18 is a side perspective view illustrating an example stationary exercise machine including a further example drive assembly.
Figure 19:
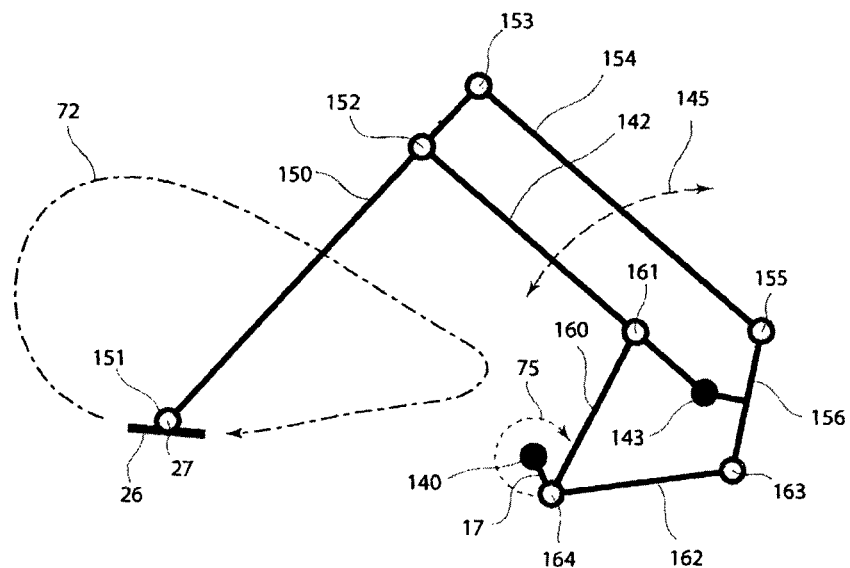
FIG. 19 is a schematic side view illustrating the further example drive assembly of FIG. 18.

Referring to FIGS. 18 and 19, there is illustrated yet another example stationary exercise apparatus (130) having a different drive assembly. In this example pedal arms (150) are again attached to tie rods (154) via pedal arm/tie rod pivots (153), and are attached to swing arms (142) via pedal arm/swing arm pivots (152). Rocker arms (156) are attached to tie rods (154) via tie rod/rocker arm pivots (155), and to swing arms (142) via swing arm/frame pivots (143). Thus, rocker arms (156) are also pivotally attached to frame (131). First push rods (160) are attached to swing arms (142) via first push rod/swing arm pivots (161). First push rods (160) are attached to second push rods (162) via push rod/flywheel crank pivots (164), which also attach first push rods (160) and second push rods (162) to flywheel (139). Again, as previously, an axis of pedal (26) traces an asymmetric ovate pedal path (72) when in use.

Figure 20:
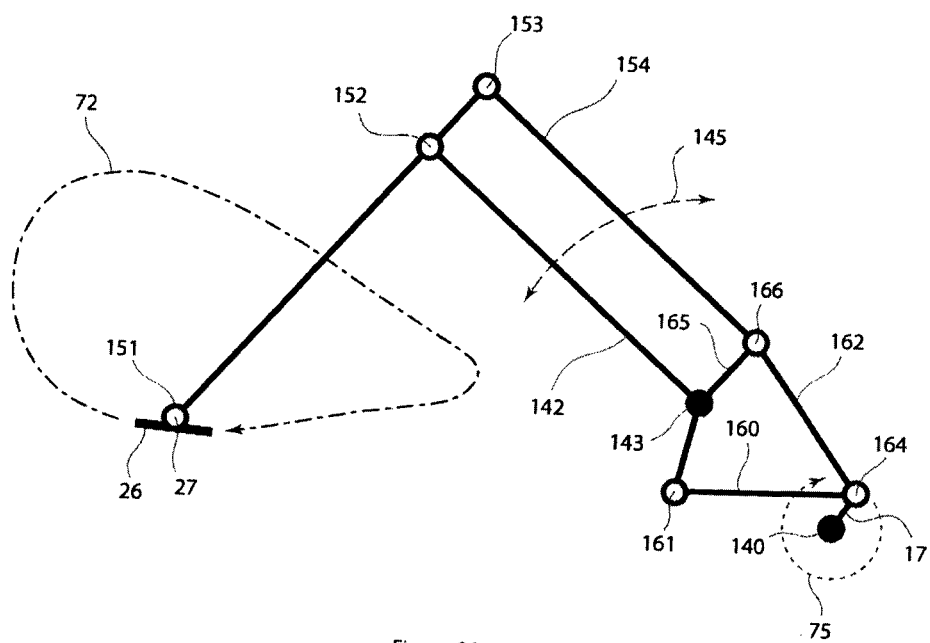
FIG. 20 is a schematic side view illustrating a further example drive assembly.
Figure 21:
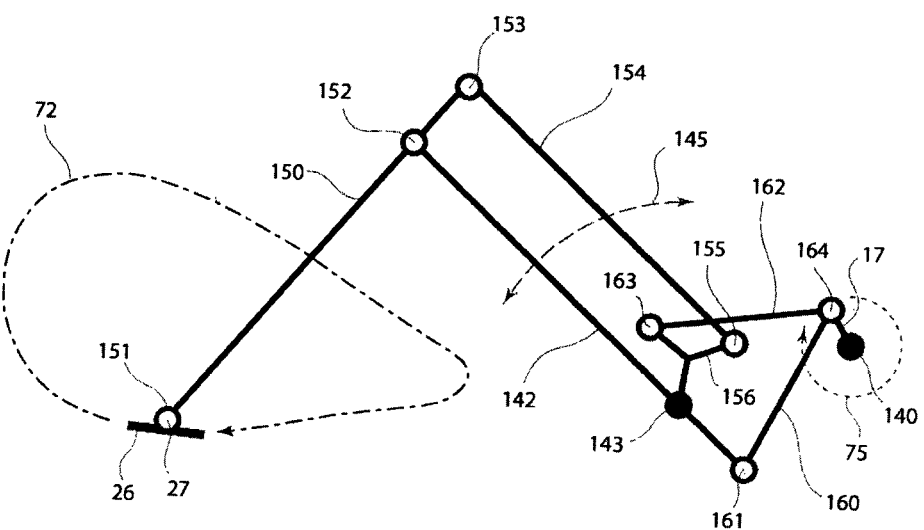
FIG. 21 is a schematic side view illustrating a further example drive assembly.

Referring to FIGS. 20 and 21 there are illustrated schematic side views of further example drive assemblies. In the example illustrated in FIG. 20, there is additionally provided tie rod links (165) that are connected to swing arms (142) via swing arm/frame pivots (143), and are also attached at the other end to tie rods (154) via tie rod link pivots (166). As previously, solid black circles are indicative of fixed pivot points, whereas open circles are indicative of pivot points that are able to move in two dimensions.

Figure 22:
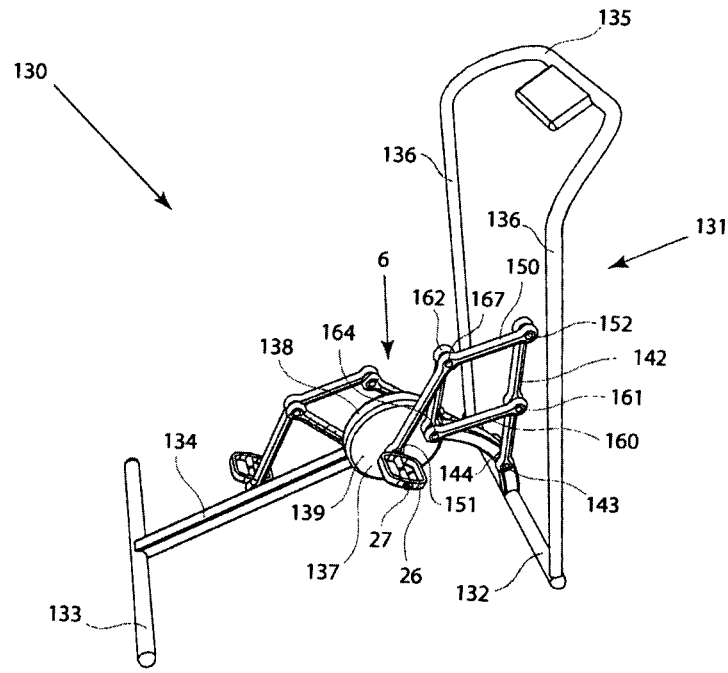
FIG. 22 is a side perspective view illustrating an example stationary exercise machine including a further example drive assembly.
Figure 23:
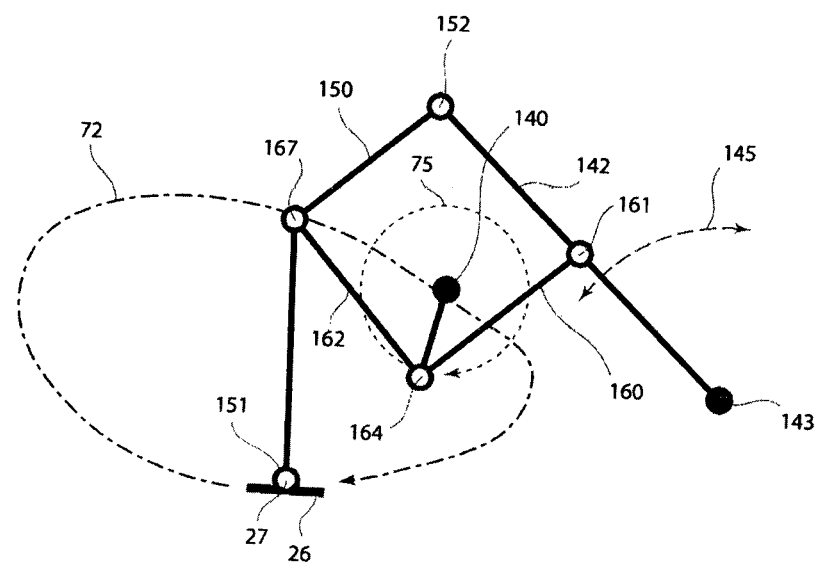
FIG. 23 is a schematic side view illustrating the further example drive assembly of FIG. 22.

Referring to FIGS. 22 and 23 there is illustrated yet a further example stationary exercise machine (130) with a further example drive assembly. In this example there is additionally provided second push rod/pedal arm pivots (167) that connect pedal arms (150) to second push rods (162). As illustrated, in this example pedal arms (150) are also pivotally connected to swing arms (142) at pedal arm/swing arm pivots (152). Second push rods (162) are pivotally connected to first push rods (160) at push rod/flywheel crank pivots (167).

Figure 24:
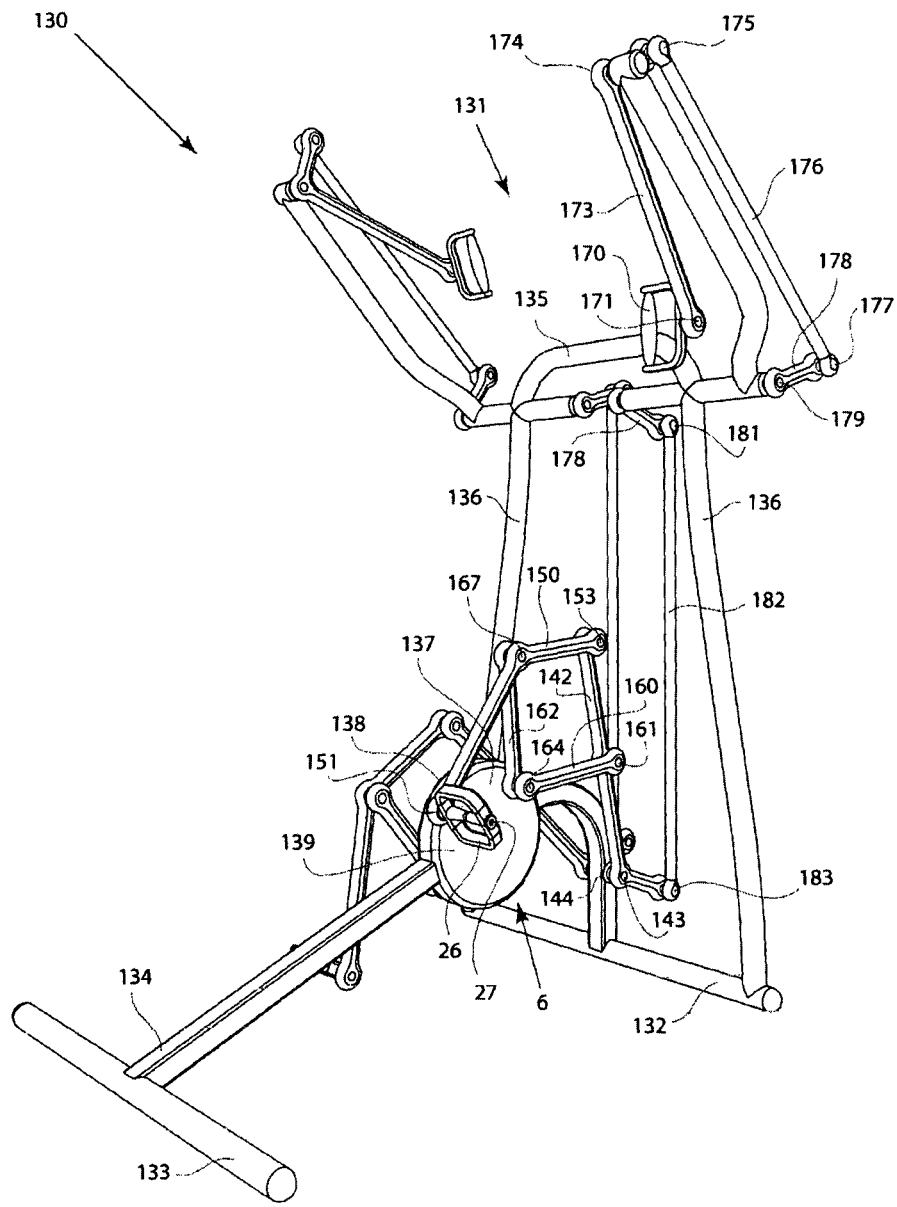
FIG. 24 is a side perspective view illustrating an example stationary exercise machine including the further example drive assembly of FIG. 22 with the addition of an arm exercise mechanism.
Figure 25:
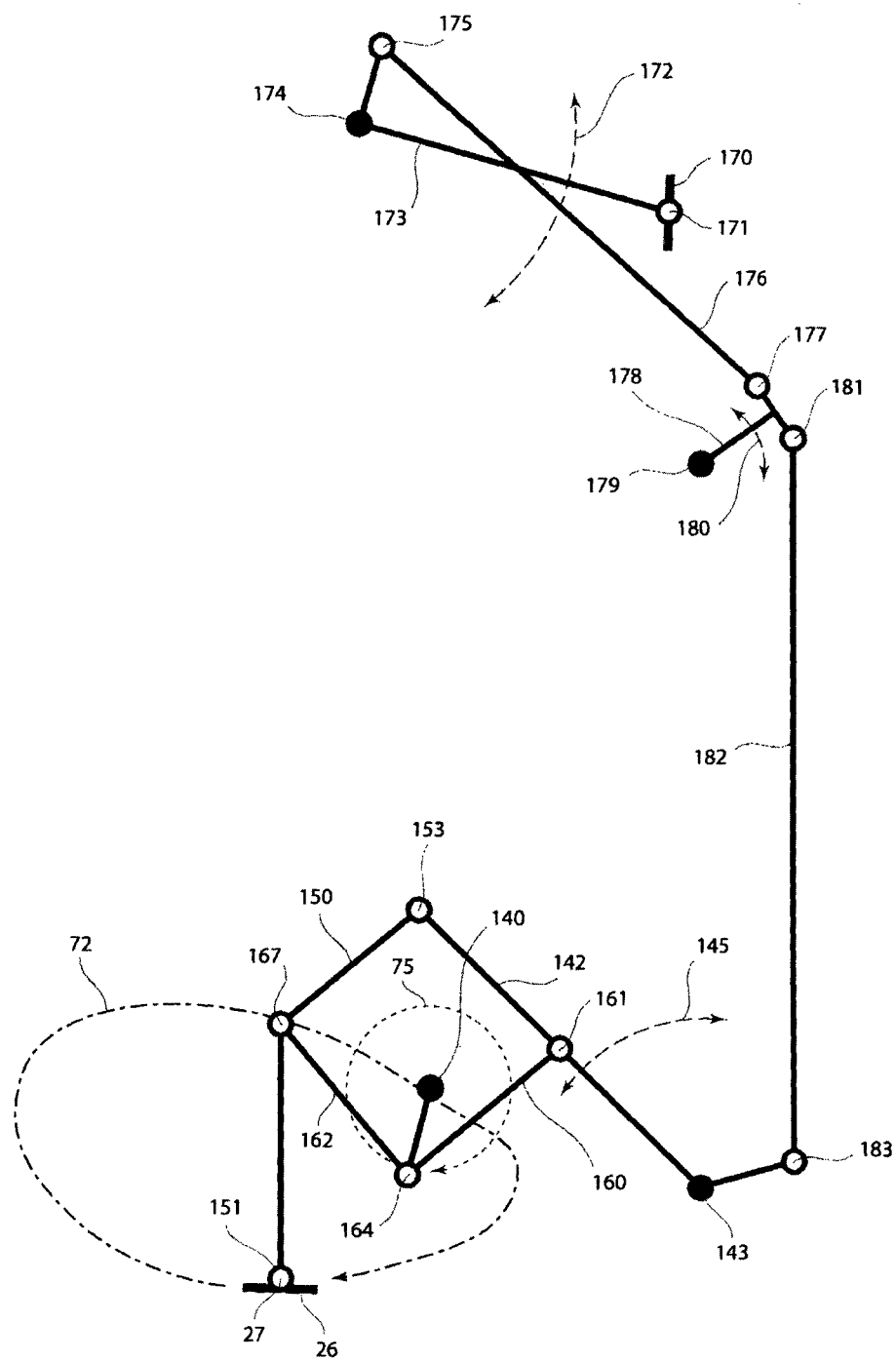
FIG. 25 is a schematic side view illustrating the further example drive assembly of FIG. 24.

Referring to FIGS. 24 and 25 there is illustrated a further example stationary exercise machine (130) with the addition of an arm exercise mechanism or hand driven assembly. In the example illustrated, the drive assembly components connected to pedals (26) are the same as illustrated in FIGS. 22 and 23. However, it should be appreciated that alternatively any other foot drive assembly or crank arrangement, that is different types of rotatable member, can be used with the arm exercise mechanism or hand driven assembly of FIG. 24. For example, the crank arrangements (6) illustrated in any of FIG. 1, 14, 16 or 18 could be utilised. Additionally, second tie rods (182) are pivotally connected to swing arms (142) via second tie rod/swing arm pivots (183). The upper ends of second tie rods (182) are connected to inner rockers (178) via second tie rod/rocker pivots (181). Rocker/frame pivots (179) connect outer rockers (178) to frame (131). Handles (170) are provided for a user to grip while using apparatus (130). Handle spindles (171) allow handles (170) to rotate with respect to handle arms (173). The handle reciprocating motion (172) is illustrated showing the general motion of handle arms (173). Handle/frame pivots (174) allow handle arms (173) to pivot. Handle/first tie rod pivots (175) connect handle arms (173) to first tie rods (176). A lower end of first tie rods (176) is pivotally connected to rockers (178) via first tie rod/rocker pivots (177).

Thus, in operation, as a person moves handles (170) in a generally outward and inward direction with respect to the person's body this causes handle arms (173) to rotate about handle/frame pivots (174), which in turn drives rockers (178) generally in rocker reciprocating motion (180) as illustrated in FIG. 25. This motion applies an additional force to swing arms (142) via second tie rods (182). Thus, a person using apparatus (130) can use both pedals (26) and handles (170) to drive crank arrangement (6). Crank arrangement (6) can be structured to provide resistance, such as by using a flywheel, which allows the person to exercise using both arms and legs simultaneously.

While the drive assembly has been described for use with an example of a bicycle and stationary exercise machines, it should be appreciated that the drive assembly, in particular the crank arrangement, can find use in other applications and may be fitted to any form of exercise machine and/or transportation machine.

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Listing of reference numerals and example components as illustrated in the figures:

1 bicycle
2 frame
3 front end
4 rear end
5 shuttle assembly
6 crank arrangement
7 drive assembly
8 head tube
9 steering forks
10 elongate stem
11 handle bars
12 top tube
13 down tube
14 track member
15 vertical supporting tube
16 upper and lower chain stays
17 crank arms
18 (crank) shaft
19 (crank) housing
20 (stirrup forward pivot/shuttle) spindle
21 shuttle wheels
22 stirrup
23 stirrup forward pivot
24 stirrup rearward pivot
25 stirrup pedal attachment point
26 pedal
27 (pedal) spindle
28 driving sprocket
29 driven sprocket
30 chain
31 front wheel
32 rear wheel
33 rear hub
34 (shuttle) first bearing
35 (shuttle) first wheel with rounded outside surface
36 (shuttle) second bearing
37 (shuttle) spacer
38 (shuttle) second wheel with flat outer surface
39 (shuttle) third bearing
40 (shuttle) threaded fastener
41 (stirrup rearward pivot) threaded spindle with capped end
42 (stirrup rearward pivot) first bearing
43 (stirrup rearward pivot) housing
44 (stirrup rearward pivot) second bearing
45 (crank arm) outer end
46 (crank arm) fastener
47 (crank arm) inner end
48 (crank) bearings
49 shuttle fastener access hole
50 track grooved rail
51 track flat rail
52 (stirrup) sideways twisting action
53 (stirrup) vertical front tube 54 (stirrup) pedal attachment lug
55 (stirrup) horizontal link tube
56 (stirrup) pedal offset lug
57 (stirrup) vertical rear tube
58 (stirrup) diagonal support tube
59 line showing pedal attachment point (25) aligned with outer end of crank arm (45)
60 grooved monocoque track member
61 Y-shaped shuttle member
62 (stirrup forward pivot) housing
63 (stirrup forward pivot) attachment point
64 (shuttle) upper wheels
65 (shuttle) lower wheel
66 (shuttle) axles
67 (track member) upper grooved rail
68 (track member) lower grooved rail
71 reciprocating linear shuttle assembly path along the track member
72 asymmetric ovate pedal path
73 pedal height at forward apex
74 pedal height at rearward apex
75 crank arm axis of rotation
76 crank arm circular motion
77 upper centre point
78 upper dead point
80 an elliptical trainer
81 reciprocating linear path of pedal platform front end
82 elliptical pedal path
83 pedal platform front end
84 pedal platform back end
85 elongate pedal platform
86 pedal foot pad
87 upper centre point
88 upper dead point
90 runner (trace of middle distance athlete sprinting)
91 runner's foot
92 running surface
93 foot path during leap phase
94 foot path during impact phase
95 foot path during drive phase
96 foot path during recovery phase
97 runner's knee
98 runner's buttocks
100 overlay of leap, impact, drive and recovery foot positions
101 foot path of a runner sprinting
102 foot path of a runner running
103 foot path of a runner jogging
104 recovery height of foot paths
110 pedal path during leap phase
111 shuttle assembly moves forward in track
112 crank arrangement rotates to 2:30 o'clock
113 pedal path during impact phase
114 shuttle assembly moves backward in track
115 crank arrangement rotates to 5:30 o'clock
116 pedal path during drive phase
117 shuttle assembly continues backward in track
118 crank arrangement rotates to 8:30 o'clock
119 pedal path during recovery phase
120 shuttle assembly moves backward and forward in track
121 crank arrangement rotates to 11:30 o'clock
130 a stationary exercise apparatus
131 the exercise apparatus' frame
132 forward frame cross-member
133 rearward frame cross-member
134 transverse frame member
135 handle arrangement
136 handle arrangement legs
137 rotatable unit
138 fixed housing
139 flywheel
140 flywheel crank centre of rotation
141 Y shaped stirrup
142 swing arm
143 swing arm/frame pivot
144 swing arm/frame pivot housing
145 swing arm reciprocating motion
150 pedal arm
151 pedal attachment point
152 pedal arm/swing arm pivot
153 pedal arm/tie rod pivot
154 tie rod
155 tie rod/rocker arm pivot
156 rocker arm
157 rocker arm/flywheel crank pivot
158 rocker arm/swing arm pivot
160 first push rod
161 first push rod/swing arm pivot
162 second push rod
163 second push rod/rocker arm pivot
164 push rod/flywheel crank pivot
165 tie rod link
166 tie rod link pivot
167 second push rod/pedal arm pivot
170 handle
171 handle spindle
172 handle reciprocating motion
173 handle arm
174 handle/frame pivot
175 handle/first tie rod pivot
176 (handle driven assembly) first tie rod
177 (handle driven assembly) first tie rod/rocker pivot
178 (handle driven assembly) rocker
179 (handle driven assembly) rocker/frame pivot
180 (handle driven assembly) rocker reciprocating motion
181 (handle driven assembly) second tie rod/rocker pivot
182 (handle driven assembly) second tie rod
183 (handle driven assembly) second tie rod/swing arm pivot

The invention claimed is:

1. A drive assembly for utilising motion of a person running or jogging, the drive assembly comprising:
   a rotatable member coupled to a frame of a machine, the frame having a front end and a rear end;
   a stirrup, and a foot pedal pivotally attached to the stirrup at a pivot axis;
   a first pivot connected between the stirrup and the rotatable member; and,
   a second pivot connected between the stirrup and the frame;
   wherein in use the pivot axis of the foot pedal travels both in front of and behind a rearward position of the second pivot, and the second pivot follows a substantially forward upward and backward downward reciprocating path relative to the frame, and the pivot axis of the foot pedal remains below the first pivot during motion of the foot pedal.

2. The drive assembly of claim 1, wherein in use the pivot axis of the foot pedal remains below the first pivot and the second pivot during motion of the foot pedal.

3. The drive assembly of claim 1, wherein in use the pivot axis of the foot pedal travels both in front of and behind an axis of rotation of the rotatable member.

4. The drive assembly of claim 1, wherein in use the pivot axis of the foot pedal remains rearward of the second pivot during motion of the foot pedal.

5. The drive assembly of claim 1, wherein in use the pivot axis of the foot pedal traces an asymmetric ovate path during motion of the foot pedal.

6. The drive assembly of claim 1, wherein in use a rearward apex of the foot pedal's path is above a forward apex of the foot pedal's path.

7. The drive assembly of claim 1, wherein in use the foot pedal traces a reciprocating path which is substantially similar to a path traced by a foot of the person when running or jogging.

8. The drive assembly of claim 1, wherein the pivot axis of the foot pedal is provided by a pedal spindle.

9. The drive assembly of claim 1, wherein the rotatable member is a crank arrangement including crank arms and a sprocket.

10. The drive assembly of claim 1, wherein the stirrup includes a pedal offset lug to inwardly offset an attachment point of the foot pedal.

11. The drive assembly of claim 1, including a further stirrup on the opposite side of the frame, and a further foot pedal pivotally attached to the further stirrup.

12. The drive assembly of claim 1, wherein the second pivot is connected to the frame via a shuttle assembly.

13. The drive assembly of claim 1, wherein the second pivot is connected to the frame via a wheel able to move along a track member.

14. The drive assembly of claim 13, wherein the track member is a monocoque track member with one or more grooved rails.

15. The drive assembly of claim 13, wherein a frontward end of the track member is angled upward relative to a rearward end of the track member.

16. The drive assembly of claim 13, wherein at least one grooved rail in the track member confines the wheel to follow a linear reciprocating path.

17. The drive assembly of claim 1, wherein the machine is a bicycle.

18. The drive assembly of claim 1, wherein the machine is a stationary exercise apparatus.

19. The drive assembly of claim 18, wherein the second pivot is coupled to the frame via a swing arm.

20. A bicycle for utilising motion of a person running or jogging, the bicycle comprising:
   a front wheel and a rear wheel attached to a frame, the frame having a front end and a rear end;
   handle bars attached to the frame;
   a crank arrangement attached to the frame and configured to drive the rear wheel;
   stirrups, a stirrup positioned on either side of the frame;
   foot pedals, a foot pedal pivotally attached to one of each of the stirrups at a pivot axis;
   first pivots, a first pivot connected between one of each of the stirrups and the crank arrangement; and,
   second pivots, a second pivot connected between one of each of the stirrups and the frame via one or more wheels able to move along a track member;
   wherein in use the pivot axis of the foot pedal travels both in front of and behind a rearward position of the second pivot, and the second pivot follows a substantially forward upward and backward downward reciprocating path relative to the frame, and the pivot axis of the foot pedal remains below the first pivot during motion of the foot pedal.

* * * * *